Jan. 8, 1952  N. A. LOMBARD ET AL  2,581,421
METHOD AND APPARATUS FOR MAKING STRUCTURAL ELEMENTS
Filed April 27, 1948  6 Sheets-Sheet 1
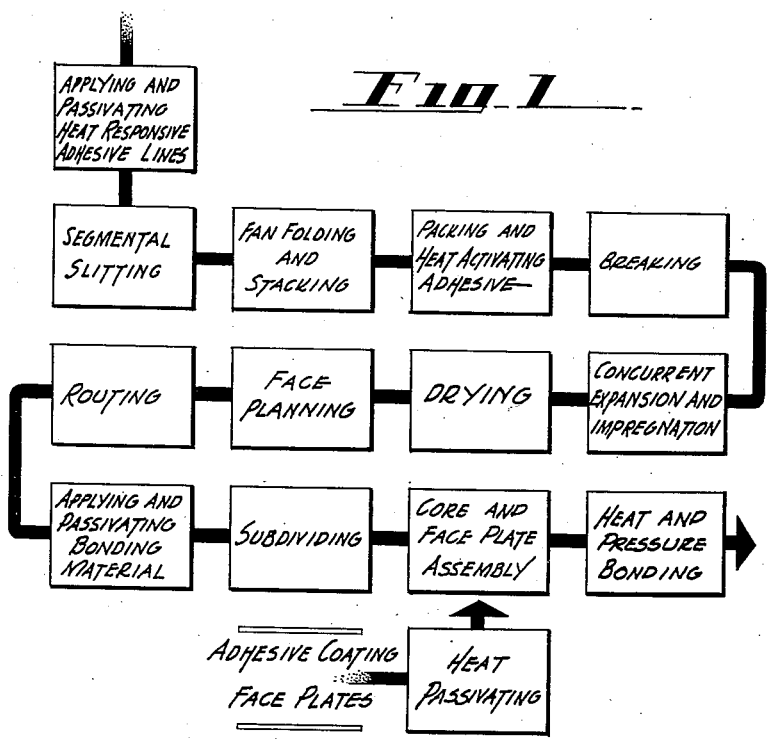
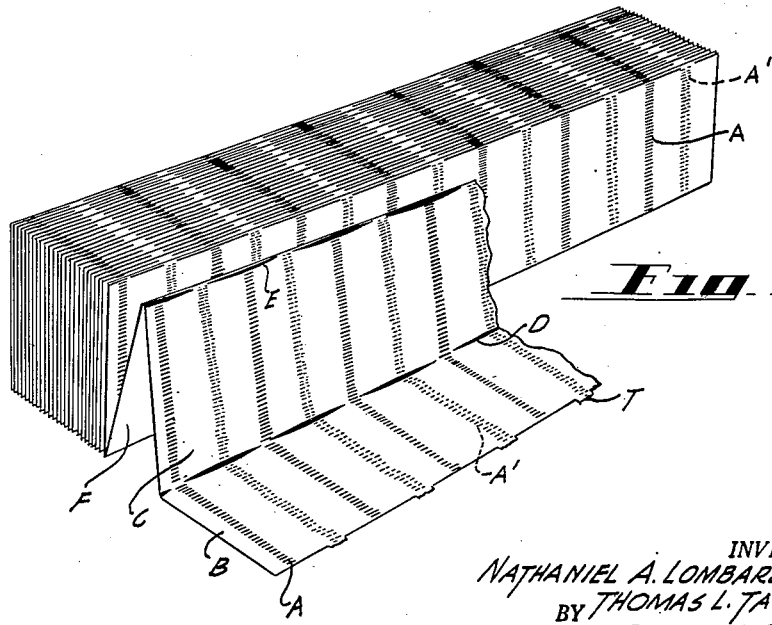
INVENTOR.
NATHANIEL A. LOMBARD AND
BY THOMAS L. TAGGART
ATTORNEY Jan. 8, 1952  N. A. LOMBARD ET AL  2,581,421
METHOD AND APPARATUS FOR MAKING STRUCTURAL ELEMENTS
Filed April 27, 1948  6 Sheets-Sheet 2
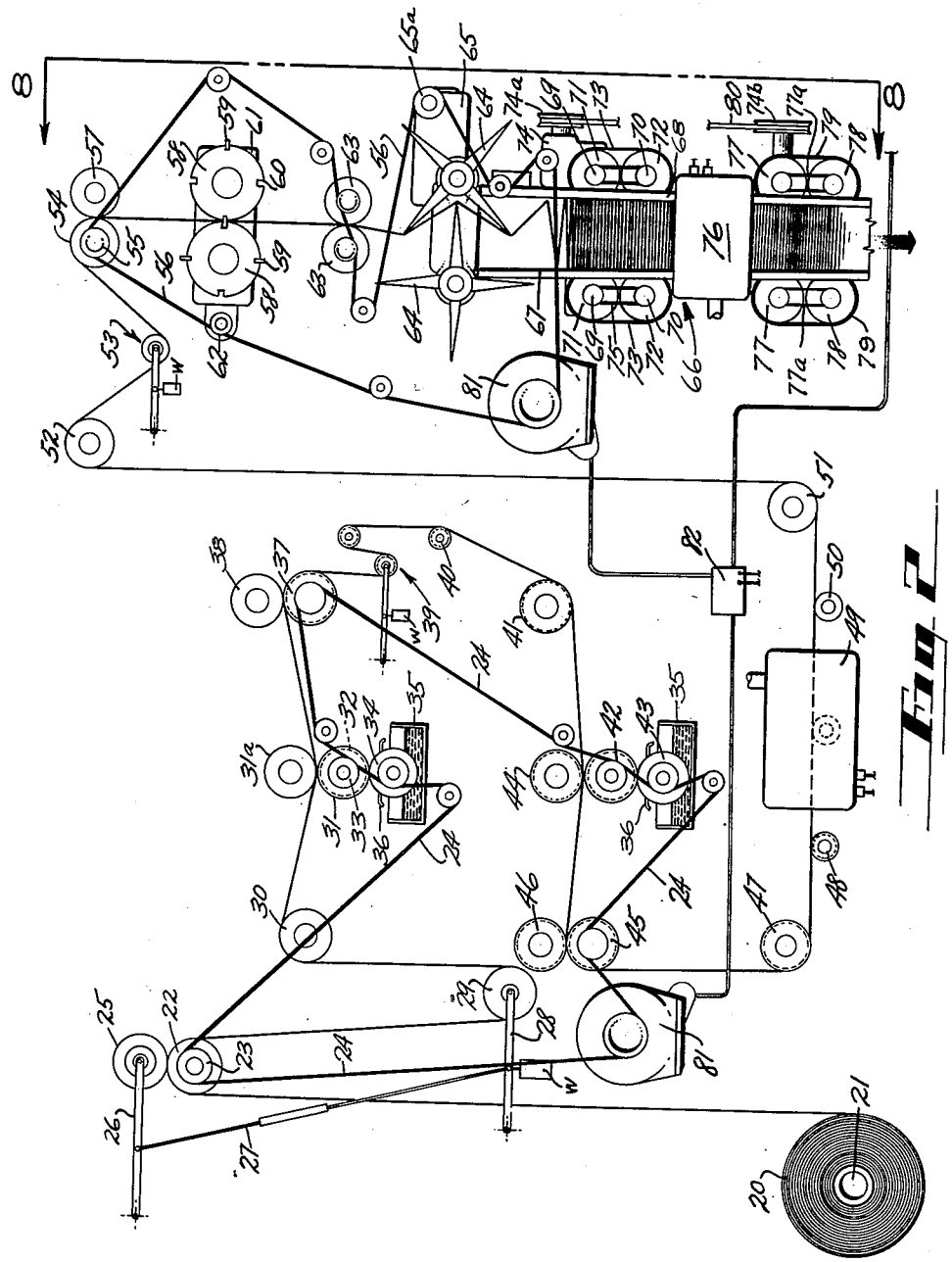
INVENTOR.
NATHANIEL A. LOMBARD
BY THOMAS L. TAGGART
Edwin Coates
ATTORNEY Jan. 8, 1952     N. A. LOMBARD ET AL     2,581,421
METHOD AND APPARATUS FOR MAKING STRUCTURAL ELEMENTS
Filed April 27, 1948     6 Sheets-Sheet 3
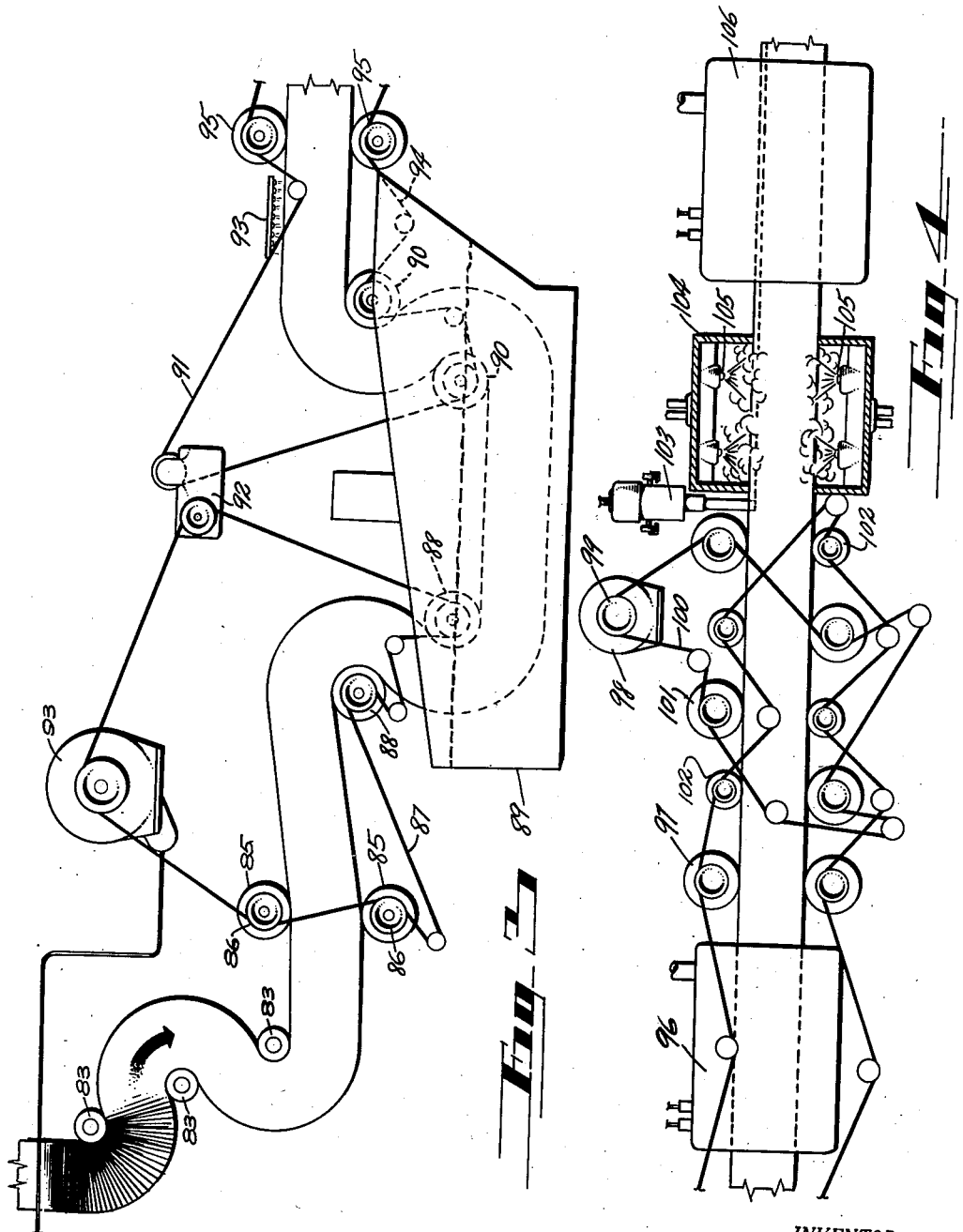
INVENTOR.
NATHANIEL A. LOMBARD
BY THOMAS L. TAGGART
Edwin Coate
ATTORNEY

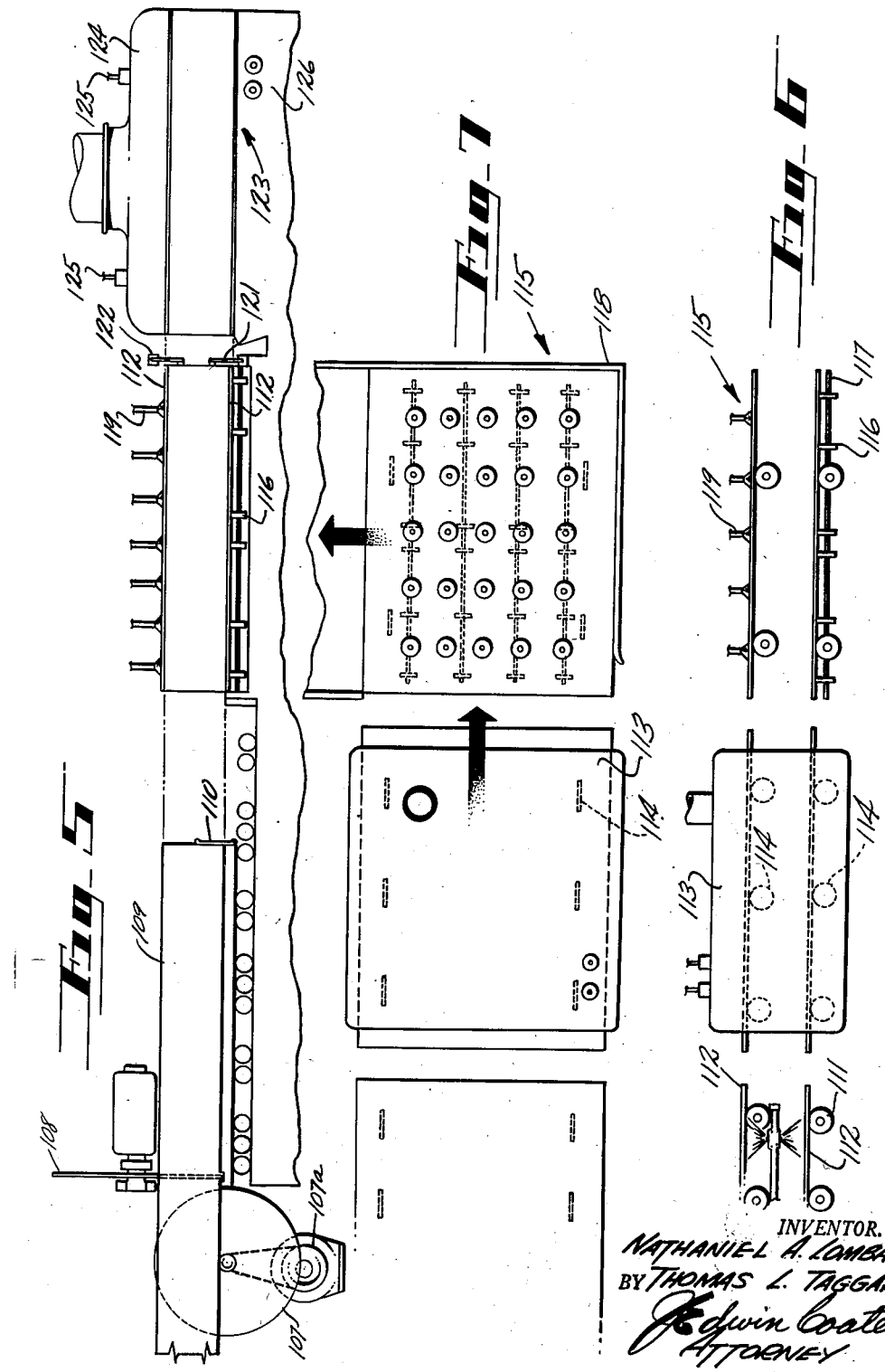

Jan. 8, 1952   N. A. LOMBARD ET AL   2,581,421
METHOD AND APPARATUS FOR MAKING STRUCTURAL ELEMENTS
Filed April 27, 1948   6 Sheets-Sheet 5
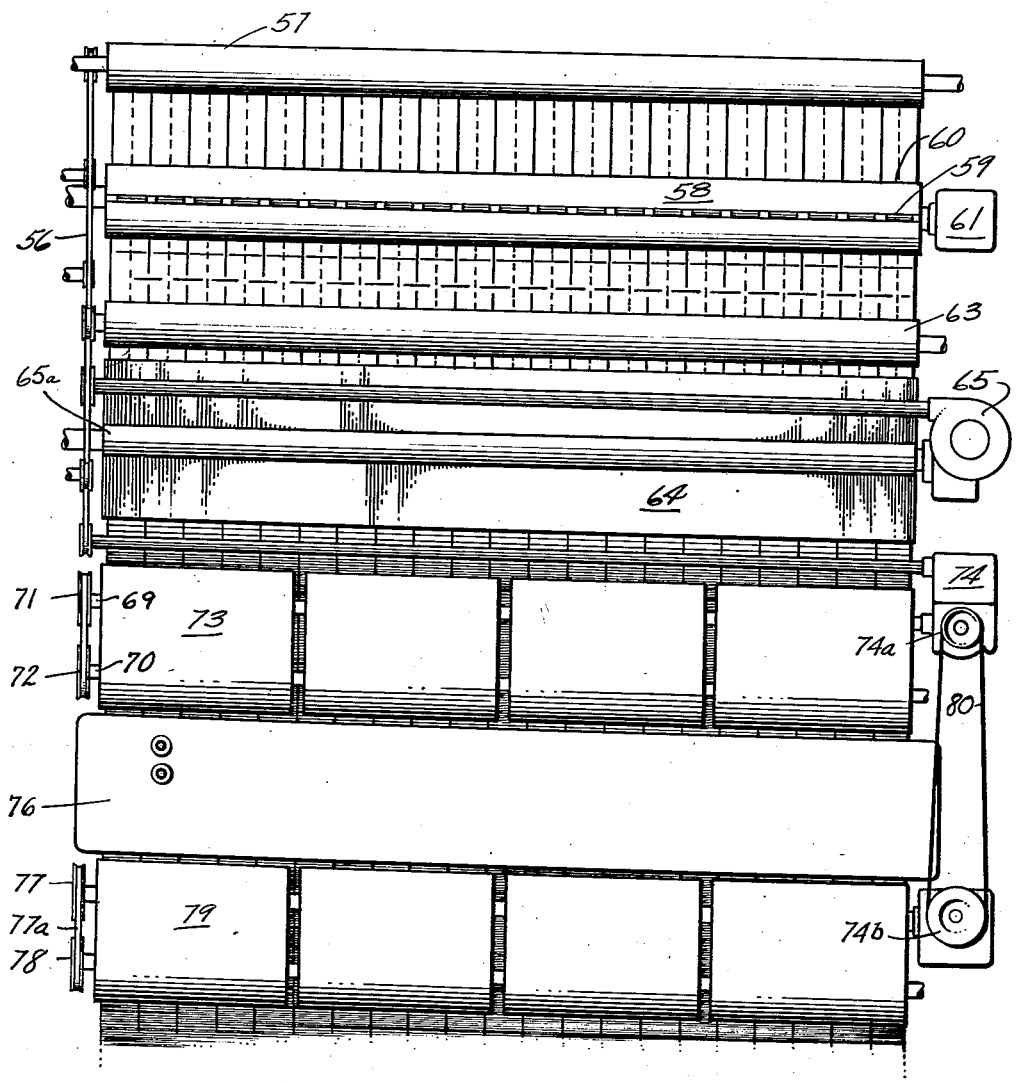
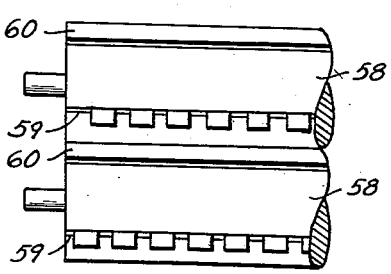
INVENTOR.
NATHANIEL A. LOMBARD
BY THOMAS L. TAGGART
Edwin Coates
ATTORNEY

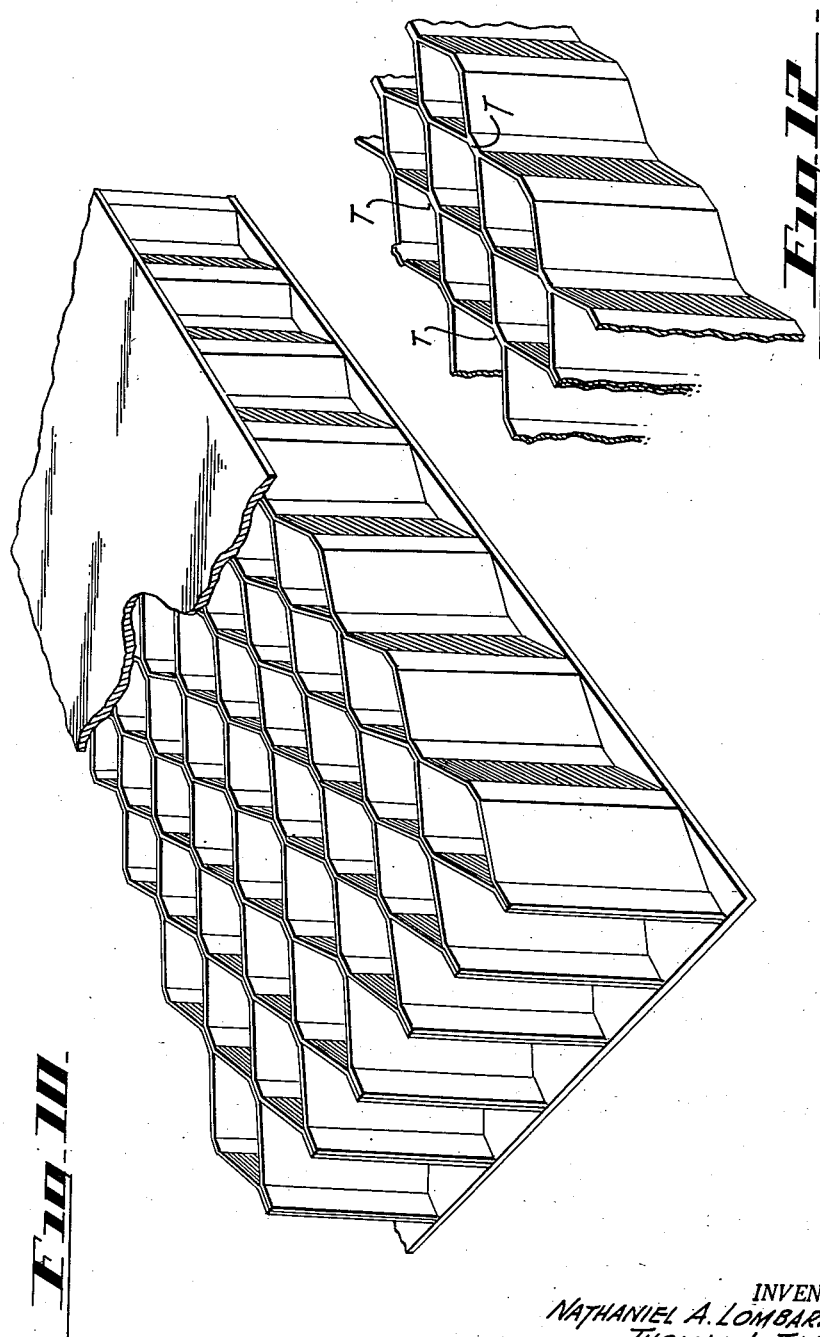

Patented Jan. 8, 1952

2,581,421

UNITED STATES PATENT OFFICE 2,581,421

METHOD AND APPARATUS FOR MAKING STRUCTURAL ELEMENTS

Nathaniel A. Lombard, Glendale, and Thomas L. Taggart, Beverly Hills, Calif.; said Lombard assignor to Douglas Aircraft Company, Inc., Santa Monica, Calif.

Application April 27, 1948, Serial No. 23,486

33 Claims. (Cl. 154—1)

Subject invention deals with multi-cellular webs such as honeycombed cores or slabs and particularly relates to methods and means for producing same, its general aim being to provide a novel and improved process and apparatus introducing to the art, ultra-rapid manufacture, on the large-quantity scale, of improved articles of this class.

The multi-cellular article which is one of the products of this invention is primarily contemplated as made of paper, canvas, fiber or similar felted, woven or web material, worked into the form of a core or spacer for laminated articles such as housing walls. However, the inventive concepts by no means exclude the fabrication by their methods and means, of thin and ductile metal sheets, such as copper, stainless steel or the like, into honeycombed radiators, multi-cellular structural lattice work, concrete construction-slab reinforcing, or the like, with suitable adjuncts or variations where obviously necessary.

Heretofore the fabrication of subject article has necessitated the employment of either a stack method, or a multi-roll, multi-layering method. The first-mentioned process entails the utlization of numerous disconnected, intermittent operations carried out in separate locations, the stages being completed on separate machines, since it involves the employment of a plurality of separate sheets of material, which must be individually glued on each side, then stacked together and compressed, and finally expanded into multi-cellular form. The second-mentioned method utilizes a plurality of cooperating rolls of paper from each of which the paper is convergently led into vertically super-imposed relationship in a centralized station in which the sheets are supported in vertically spaced relationship, then being glued, and finally being expanded into honeycomb form.

The previous methods of fabricating subject depthwise foraminous, multi-cellular webs or reticules thus have excluded the possibility of a continuous-flow, connected-step method; and of a single, integral continuously operating, once-through machine. In addition to the extreme bulkiness of each component mechanism and the excessive amount of floor area necessitated to complete the processing, they entail an excessively high expenditure of time and labor, as well as an expensive amount of material, particularly paper and adhesives. Moreover, the final result is a rather inferior article in which the cells are not always uniform in size or spacing, or the glue lines are spread, the cell-interiors are filled with adhesive, or other defects occur.

By means of the concepts of the present invention, it is made feasible to rapidly and inexpensively fabricate, in a single machine, and in a relatively small amount of floor area, unlimited quantities of a uniform cell-size, depthwise foraminous, multi-cellular web substantially free of defects. To achieve these ends, the invention provides a novel, continuous-flow, connected-step method and a continuously-performing, once-through machine capable of producing either a laminated structural slab or panel comprising a honeycomb web core faced with sheet metal; a bare-face, expanded, multi-cellular core; or a compacted multi-layer, multi-cellular pack.

Briefly, the essential steps necessary to fabricate the aforesaid pack, which is the least complex, usable article producible by the invention, from a flexible web, such as paper, essentially comprises advancing a single web into the zone of operations; applying to opposite faces of the advancing, and preferably tensed, web, longitudinally extending uniting-lines of adhesive with the lines on the one face laterally separated in staggered relationship to the lines on the opposite face; slitting the web transversely in a plurality of longitudinally spaced lines of longitudinally separated incisions, the incisions in the adjacent lines being mutually laterally staggered; fan-folding or zig-zag folding the web in such a way that on the first folding step the lines of adhesive on the faces of the first zig and zag folds brought into engagement are uninterrupted by the lines of incisions at the line of fold; continuing the folding of the web; stacking the folds to unite same on said uniting-lines to form the web into a compact mass, and thereby providing a compact but expandible depthwise-foraminous multi-cellular reticule which is storable and transportable in this compacted form and expandible at its destination; severing this portion from the rest of the web, and removing the severed portion from the operating zone.

The slitting operation may be performed either during or after the folding operation, if desired, instead of before the folding action. Moreover, instead of slitting the web to enable expansion, the fold-edges may be abraded off or otherwise removed in order to permit the pack to be expanded.

Thus the method and apparatus of this invention have produced at this juncture, a pack which is expandible into a honeycomb, the pack comprising an integral fan-folded web of material, the pack presenting a plurality of contiguous lines of fold at opposed lengthwise faces of the pack. Parallel lines of adhesive extend across each face of each fold substantially at right angles to the lines of fold and unite each face to the adjacent face of the contiguous fold along a series of lines staggered with respect to the adhesive lines uniting the opposite face of said fold to the face of the next adjacent fold. The lines of fold at opposite faces of said fan-folded web are broken by lines of spaced incision, the incisions formed in the lines of fold on the one face of the fan-folded web being laterally staggered with respect to the incisions formed in the lines of fold on the opposite face of said fan-folded web.

The article above described can thus be manufactured without trimming off, grinding off, or otherwise removing, the longitudinal edges of the folds and forming a pack of separate layers of web-material. Among other consequences, "dishing-in" of certain areas of the lengthwise faces of the stack occurring because of imperfections in the abrasive rollers, is entirely obviated.

This intermediate product of the invention can be stored or transported in compact form and later expanded, impregnated with protective and rigidifying material and bonded to facing plates of suitable material.

The ultimate article fabricatable by the present invention, namely a laminated panel comprising one of these cores facewisely bonded to facing sheets of metal, Masonite or the like, briefly, is automatically produced by advancing a continuous web of relatively flexible fibrous material into the zone of operations; applying to opposite faces thereof, longitudinally extending lines of adhesive with the lines on the one face laterally offset in staggered relationship to the lines on the opposite face; slitting the web transversely in a plurality of lines spaced longitudinally of the web, each of the lines comprising a plurality of incisions spaced longitudinally in the line, the incisions in one of any two adjacent lines of slits being staggered, or offset laterally of the web, with respect to the incisions in the other of the adjacent lines of slits, so that in alternate slit-lines, the incisions cut through, and are bisected by, all the glue lines on the one face of the web, while in the intervening slit-lines the incisions cut through and are bisected by all the glue lines on the opposite face of the web; fan-folding the so-processed web by displacing it alternately in opposite directions on the lines of weakness constituted by said lines of slits, the first and subsequent directions being as mentioned hereinabove; so stacking the folds contiguously as to unite the same along the lines of adhesive and to form the sheet into a fan-folded mass; slightly separating the layers of the compact mass laterally intermediate the lines of union to condition the mass for stretching to its ultimate honeycomb form; advancing the leading end of the slightly expanded mass faster than the trailing end to permanently expand the same into a depthwise foraminous reticule or multi-cellular web; impregnating the material of the reticule with a protective and strengthening material; routing out, or otherwise forming, transversely, longitudinally, or diagonally extending grooves, as desired, in the opposite faces of the reticule of sufficient depth and length to accommodate joggled or recurved edges of the facing sheets; depositing an adhesive on the outer edges of the opposite ends of each cell in the reticule; subdividing the reticule transversely, longitudinally, or diagonally into submultiples of its original width and length and into any desired planiform shape; removing the severed submultiples from the web-fabricating zone and employing the bare, unfaced submultiples as independently usable insulating or filler articles; or, converging the submultiples with and between moving, parallel-spaced facing plates coated on their inner faces with a bonding agent; and bonding the plates facewise to the faces of the moving reticulate web, or core.

If accurate control or compensation of wear is maintained in the means for slitting the sheet so as to space the transversely extending lines of slits longitudinally equidistantly, and to direct these lines substantially at right angles to the opposite edges, the faces of the web will be uniplanar and fit every point of the facing sheet and no smoothing of the faces will be necessary. However, to meet the contingency that the face of the core may be vertically irregular, due to "creeping" of the folds because of imperfections in the slitting and folding mechanism, the invention contemplates the step of removing protuberances from each face of the web before the aforesaid routing step, preferably by means of abrasion, employing such means as sanding or grinding rollers, whereby to reduce each face to uniplanarity.

Articles produced at stages intermediate these extremes of the method are also usable for one purpose or another, and hence the invention contemplates the useful employment of portions of sub-combinations of the method and apparatus less than the whole and greater than the minimum, the method and apparatus being susceptible of being halted and permitting removal of the intermediate product, at any stage of the method or at any station of the machine.

By virtue of the aforestated method and apparatus, it is only necessary to employ a single elongate web of material and run it through a single, fully automatic machine which performs a continuous series of operations thereon, in order to produce a longitudinally multi-layered, depthwise multi-cellular web of indefinite length and of any predetermined width and thickness; or, if desired, a plurality of differently planiform-shaped segments of the web may be produced thereby, each segment being of any desired polygonal shape, width or length. Consequent upon these improvements is the elimination of the prior art steps of cutting out, handling, stacking and gluing, a plurality of separate, highly flexible, cumbrous layers or sheets. The time of production of the web per square foot is reduced considerably, the invention also reducing to the minimum the amount of material necessary and the number and effort of the attendants. Although the final multi-cellular web article produced hereby is, when fabricated of paper, primarily employed in combination with facing plates of metal as a laminated construction slab, this paper core, bare on both faces, may, if desired, be utilized for many other purposes, such, as for example, sound and heat insulation cores, transporting or storing fragile articles in its cells, as a multi-receptacle container, or for the like purposes.

Other features and advantages of the method of the present invention and the machine for carrying out the same will be apparent from the following description taken in connection with the accompanying drawing, in which:

Figure 1 is a flow-diagram indicating the steps of the method of making the laminated, honeycomb-cored panels of the invention;

Figure 2 is a diagrammatic side elevation of the input end of a representational form of apparatus for performing the method;

Figure 3 is a view similar to Figure 2 but showing that portion of the apparatus which performs the immediately sequential operations of method;

Figure 4 is a view similar to Figure 2 but showing that portion of the apparatus which performs those steps of the method which follow, in the now preferred embodiment, those performed by the portion of the machine shown in Figure 3;

Figure 5 is a view similar to Figure 2 but showing the terminal portions of the apparatus;

Figure 6 is a diagrammatic side elevation of the intermittently operating facing-sheet preparing and conveying portion of the apparatus;

Figure 7 is a plan view diagrammatically illustrating the last-said portion of the apparatus;

Figure 8 is a vertical elevation viewed from line 8—8 of Figure 2 showing, in superimposition, the slitting-mechanism, the fan-folding mechanism, the stacking mechanism with the guide plates removed, the adhesive heater, and the packing mechanism;

Figure 9 is a perspective view of an intermediate article completed by that portion of the apparatus which is depicted in Figure 2, the article being illustrated as a zig-zag folded pack partly unfolded at the one end to more clearly show the zig and the zag folds with the staggered incisions extending along the lines of fold.

Figure 10 is a perspective view of a portion of the laminated, honeycomb-cored structural panel produced by the present method and apparatus with a portion of one facing plate cut away to more fully illustrate the core;

Figure 11 is a fragmentary, enlarged plan view of the slitting rollers with a knife blade on one roller about to enter a groove on the adjacent roller, showing the laterally staggered relationship of the cutting portions of the successive knife blades on the adjacent roller; and Figure 12 is a fragmentary perspective view of the honeycomb core showing the ends of abutting sides of cells in the alternate rows of cells united by tabs extending transversely of said abutting sides.

As graphically summarized in the flow-sheet of Figure 1, the presently preferred embodiment of the method and apparatus is based upon the concept of operating in train upon a continuously moving single-ply web of any desired length and width and composed of substantially any desired flexible material in such a manner as to first form the web into a honeycombed core and then, in the final stages of the method and of the operation of the machine, laminate this core with facing sheets of a more rigid planar material. The end product thus automatically fabricated finds its present greatest utility in employment as a structural panel such as shown in Figure 10. Hereinafter, the flexible material from which the core is fabricated will be assumed to be the equivalent of 60-pound kraft paper of the order of 6 feet in width and of any desired length. In order to enable the employment of the preferred step of slitting the web at the fold-lines, it is preferable that this paper have a tensile strength of the order of 15 pounds per square inch. The preferred material for the facing sheets is 0.25 3S aluminum rectangular sheets of the order of 8 feet in length, chromic-etched on their interior, or core-contacting, faces. However, it is to be understood that the invention is readily adaptable to the use of Masonite or other suitably thin, strong and easily bondable material as facing sheets. It is to be understood, however, that the method and apparatus can be applied, without basic modifications of either, to the production of other honeycombed articles and other laminated panels from other materials than the paper and aluminum aforementioned. For example, canvas may be employed as the web material in fabricating honeycombed articles; or the cores of metal radiators may be fabricated from thin and ductile metal sheets, run through the machine according to the general steps of the process.

The fabrication of the aforementioned panels involves the employment of all the steps outlined in Figure 1 and requires complete passage of the paper material through the entire apparatus shown in Figures 2, 3, 4, and 5. However, certain useful articles are produced at the culmination of various sub-combinations of the steps of the method and are removable at the various stations in the machine. The invention is therefore to be interpreted only as pointed out in the annexed claims and as covering any article which can be made by the claimed steps of the method. For example, when the stacked, fan-folded sheet has passed through the packer and fold-uniter indicated generally at 66 in Figure 2, there is produced a compact but depthwise multicellular, multilayered article which can there be removed from the machine and shipped or stored in this compacted form. The article thus produced, which is illustrated in Figure 9, may at its destination be expanded, impregnated, and provided with bonding beads on each cell-end and facewise laminated with metal sheets to form the structural panel. This intermediate, or partial product, is, without further processing, employable independently, for example, as a resilient spacer, filler or cushion, or, when expanded without impregnating, as a multi-receptacle container or the like.

The complete product aforementioned is, in the illustrated embodiment of the invention, automatically and continuously produced by an apparatus, or combination of interconnected mechanisms, for automatically performing the steps of the method on a length of paper carried on a roller 20 disposed horizontally on the framework of the apparatus on a journaling group including a shaft 21 from which it is advanced as by the onward pull of various come-along rollers disposed at suitable points onward of the apparatus, which also maintain the sheet under tension through the fan-folding step, to facilitate the application of adhesive thereto, and the slitting thereof. In the presently disclosed embodiment of the apparatus and method the web is preferably advanced from the roller 20 at a linear velocity on the order of three hundred feet per minute, the apparatus being adapted to discharge from its opposite terminal, finished honeycombed core slabs, or segments thereof, at the rate of 27 linear feet per minute.

From the source roll 20 the continuously moving integral web is threaded over a come-along roller 22, provided at the one end with a sprocket wheel 23, a driving sprocket-chain 24 encircling same and being driven by synchronized electric means later described. A felt-covered hold-down roller 25 is rotatably mounted on the one end of a pivoted lever 26 normally urged downwardly to force the hold-down roller 25 against the paper. The roller 25 may be urged downwardly by means of a length-adjustable link 27, connected at its upper end to the lever 26 intermediate the ends thereof, the lower end of the link being centrally connected to a lever 28 pivoted at one end thereof to the frame of the machine. The opposite end of the lever 28 rotatably supports a floating tension-roller 29 suspended in a bight of the continuously advancing web and adapted to be adjusted upwardly or downwardly by means of link-adjustment in order to both vary the tension in the paper and dampen the chatter or vibration of the tensioned sheet. However, the paper tension is normally maintained at the desired constant value by means of a weight W suspended from the medial portion of the lever 28.

From the floating roller 29 the vibration dampened and slightly tension-rigidified sheet is trained over a guide roller 30 and into mechanism for applying to one face of the sheet, longitudinally extending, transversely spaced lines of an adhesive adapted to permanently unite the folds of the fan-folded paper. This adhesive may consist of a powdered phenolic resin of a heat-activatable nature, dispersed in a solvent such as alcohol.

The adhesive applying mechanism may, in one form, comprise an elongate cylindrical roller 31 provided with grooves 32 defining circumferentially extending, longitudinally spaced disks for picking up adhesive and applying it linearly to the paper by rotary contact of only the adhesive with the paper. At least one end of this roller is provided with a sprocket wheel 33 adapted to be driven by the sprocket chain 24, as shown. A felt-covered cylindrical roller 31a is rotatably mounted in vertical alignment with the aforementioned roller for the purpose of holding the paper downwardly against same and for backing up its reaction during the adhesive-applying process. The adhesive is supplied to the roller 31 by contact-transfer from a pick up roller 34 rotating continuously in a body of the adhesive contained in an adhesive pot 35, scrapers 36 being provided adjacent the roller 34 to remove excess therefrom.

It is to be understood that the aforedescribed construction is representational, only, and that other adhesive applying means, such as the well-known stylus type of adhesive applicator, may be employed in its stead. Moreover, the adhesive may well consist of adhesives other than the aforedescribed phenolic resin although it is now preferred to use one of the heat sensitive type which can be passivated by the heat-evaporation of the dispersant and activated by the application thereto of a higher degree of heat. The adhesive might be one which does not require heat for setting such as a cold setting adhesive, in which case the heating elements to be described would not be used.

From the station described, the web, provided on the one face with an adhesive disposed as described, passes to a come-along roller 37 which is grooved in longitudinally spaced locations, the grooves being disposed in registry with the lines of adhesive on the adjacent face of the web. A hold-down roller 38 is provided above the last mentioned roller to aid the latter in properly advancing the web onwardly of the apparatus. Onwardly adjacent these rollers is provided a slack-removing mechanism 39 constructed and operating in substantially the same manner as with reference to vibration dampening roller 29 and lever 28, but constructed on a smaller scale, and differing mainly by the fact that the rollers of this mechanism are peripherally grooved to provide clearance spaces for the adhesive lines.

The re-tensed web is now passed, via grooved idler rollers 40 and 41, to a mechanism for applying to the opposite face of the web from the face already treated, similar longitudinally extending laterally spaced lines of adhesive. An identical adhesive and mechanism similar to that previously described is employed for this purpose, the main difference lying in the fact that the adhesive applying disks on roller 42 are, with reference to those on roller 31, indexed longitudinally of the roller 42 in such manner as to apply the adhesive lines on the present face in longitudinally extending lines laterally spaced in staggered relationship to the lines on the first-mentioned face. A pick-up roller 43 and a hold-down roller 44, grooved to clear the lines of adhesive on the sub-adjacent face of the web are also provided. Roller 44 may be floatingly mounted, if desired.

From this station the web, now indexed on both faces with lines of a tacky adhesive, is advanced, by means of a grooved come-along roller 45 and a grooved hold-down roller 46, via a grooved guide or idler roller 47 and a grooved idler roller 48, to a heating zone. This zone preferably includes an oven held at such a temperature that passage of the web therethrough will dry but not set the adhesive. The oven comprises a longitudinally hollow casing 49 through which the advancing web passes and in which the solvent is evaporated from the adhesive, leaving a residue of passivated, resin bonded to the sheet in the aforedescribed lines. Venting means may be provided at the upper portion of the heater for exit of the heat-generated vapors. From the heater 49 the web passes via ungrooved guide rollers 50, 51 and 52 to a tensioning or slack-removing mechanism 53, constructed and operating in the same manner as the one generally indicated at 39.

From this device the web passes to and around the upper periphery of a come-along roller 54 driven by means of a sprocket wheel 55 and a sprocket chain 56, the paper being guided vertically downwardly therefrom by means of an idler or guide roller 57, into a mechanism mounted on the frame of the apparatus for applying transversely extending, longitudinally equidistantly spaced lines of weakness, such as creases, scores, or slits. In the present embodiment, this mechanism is shown as a rotary slitter, including rollers 58 each bearing a plurality of knives 59 extending longitudinally the full length of each roller, the knives being equidistantly spaced around the circumference of the roller, the blades alternating with grooves 60. The knife and groove spacing on opposite rollers is so indexed that the knife blades on the one rotating roller, successively enter, at the abutting-station of the rollers successive grooves 60 on the opposite roller. Each of the knife blades is provided along its cutting edge with a plurality of notches, as best seen in Figure 8. The notches on the one knife blade lie laterally offset from the notches on the succeeding knife blade so that the incisions in any two adjacent slit-lines are so staggered that the incisions in alternate slit-lines intersect the glue-lines on the face of the web, while in the intervening slit-lines, the incisions intersect the glue-lines on the opposite face of the web. It should be noted that the longitudinally adjacent ends of the slits in all lines of slits are longitudinally spaced apart a distance only slightly greater than the width of the adhesive lines not incised by the slits. Thus it will be seen that the incised glue lines bisect the incising slits.

Slitting-roller synchronizing mechanism 61 of any suitable rotation-synchronizing type found on the market is provided at the outer ends of the slitter rollers. This mechanism is adapted to be driven by the sprocket chain 56 via a sprocket wheel 62 in such manner that the incisions in each line are made simultaneously by the two rollers, so that they will lie in the same transverse line. In order that the longitudinally separated lines of incisions may extend substantially perpendicularly to the opposite edges of the web and that the longitudinal spacing of these lines be absolutely equidistant, throughout the full length of the web, provision may also be made for statically and dynamically balancing the slitting rollers and for automatically compensating for wear of their bearings, etc.

A pair of transversely extending, laterally spaced, oppositely rotating come-along rollers 63 is disposed vertically below the exit of the sheet from the slitting rollers, in order to advance the paper therefrom, these come-along rollers also serving the purpose of guiding the slitted sheet into the next station of the apparatus.

Next in the sequence of steps is the operation of fan-folding the slitted web at each of the transversely extending, longitudinally equidistantly spaced lines of incisions. For this purpose there is shown, but by way of example only, a fan-folding device well-known in the manifolding and allied trades and consisting of a star wheel folding mechanism.

It is to be definitely understood, however, that the invention contemplates the feasibility of fan-folding the advancing web material in any manner or by any well-known mechanism adaptable to this purpose, the nature of the web material, the linear velocity thereof and other factors influencing the choice of the particular folding means. The invention accordingly includes within its scope the employment of two horizontally opposed, inwardly and outwardly reciprocating folding-blades; elongated worm screws and worm wheels, as employed in the book making industry; or even intermittently acting oppositely directed horizontal jets of air disposed on opposite faces of the web in this station.

In any event, the opposed members performing the folding are synchronized in relation to each other and to the rate of arrival of the longitudinally separated lines of slits in such a manner as to invariably fold the advancing web alternately in opposite directions transversely of the paper at the lines of incisions to continuously produce a fan-folded web while the same is advancing.

The web is fan-folded or zigzag folded in such a way that on the first folding step, referring now to Figure 9, the lines of adhesive A on the contiguous faces of the first zig fold B and first zag fold C, brought into engagement by the first folding operation, remain uninterrupted by lines of incisions D at the first line of fold. The web is then folded in the opposite direction so as to leave uninterrupted by the incisions E at the second fold-edge the lines of adhesive A¹ on the opposite face of the web, and which join the contiguous faces of the first zag fold C and the second zig fold F. That is to say, the web is zigzag folded in such a manner that the first folding brings together the unincised adhesive lines on the one face of the first two fold portions and the second folding brings together the unicised adhesive lines on the opposite faces of the next two fold portions, and so on alternately, to the end that the finished pack can be expanded without rupturing any portion of the web.

The fan-folding mechanism, shown representationally in Figure 2, comprises a pair of elongate, four-bladed star wheels 64. The star wheels are rotatably mounted on horizontally disposed, transversely extending axes and are rotated in synchronism by means of suitable rotation-synchronizing means 65 powered through a sprocket wheel 65a driven by the sprocket chain 56. The blades of the adjacent star wheel are meshed in radially overlapping relationship in such manner that the edges of the blades of the star wheels contact the web contiguous to the transversely extending slit-lines, the contacts alternating on opposite sides of the web and as between the star wheels.

Although the slitting operation has been described as occurring before the folding operation, it is to be understood that it could as well be performed concurrently with the folding operation, if desired, necessitating merely providing the star wheel arms with blade segments normally carried within the arms of the wheel, but movable outwardly by conventional means such as cams, at the fold displacing contact zones, the segments, of course, being mutually laterally staggered on successive star wheel arms.

Vertically disposed below the folding mechanism, a stacking mechanism, generally designated by reference numeral 66, is disposed to receive the descending folds of the web as they emerge from the folding mechanism, arranged them in a vertical stack and guide the stacked folds downwardly and onwardly of the machine. This mechanism comprises a conduit formed by a pair of vertically arranged plates 67 and 68, the plates being mounted for inward and outward movement to vary the cross-sectional area of the conduit so that cores of various depthwise extent may be manufactured in the one machine. In the upper portion of each of the plates 67 and 68 there is provided a plurality of horizontally extending rectangular apertures, not shown, as the plates 67 and 68 have been removed from the machine as shown in Figure 8 for the sake of more clearly illustrating the portion of the machine shown by this figure. A pair of horizontally extending vertically spaced parallel shafts 69 and 70 mounted adjacent the outer faces of the plates 67 and 68 carry a plurality of rollers 71 and 72 projecting into the upper and lower portions of each aperture. Around the vertically spaced pairs of rollers 71 and 72 thus mounted is passed a belt 73, preferably of rubber or some other non-abrasive material non-injurious to the edges of the paper folds for moving the folded web downwardly through the stacking mechanism. The rollers 71 and 72 must obviously be driven at a much slower speed than the driven rollers heretofore mentioned and to this end a reduction mechanism generally indicated at 74 is interposed between the chain 56 and the shafts 69, the shafts 70 being driven by sprocket chains 75 passed around sprocket members carried by the shafts 69 and 70. As the belts 73 are driven at a much reduced rate of speed relative to the speed of the paper entering the stacking mechanism the folds are thereby pressed into contiguity to register and contact together the transversely separated lines of passivated adhesive on the adjacent folds, segments of the lines that originally lay on the opposite faces of the sheet before it was folded now contacting each other directly, being indexed accurately into mutual registration. Thus the adjacent faces of the successive folds contact each other only on the adhesive lines, the folds thus being in effect herein formed into a laminated honeycombed pile.

In this condition, the paper is urged at a relatively rapid rate into a heater 76 preferably consisting of a diathermal, induction-type heating device in the form of an annulus surrounding the stacking conduit. Such heater is well adapted to induce heat in even the innermost fibers of the paper and adhesive mass sufficient in degree to activate and set the adhesive. Accordingly, the adhesive-bearing, folded and stacked web can well maintain a relatively high linear velocity through this operation so that the rate of production need not be unduly slowed by the novel step of heating same during transit.

The lower portion of each of the plates 67 and 68 is, similarly to the aforementioned portion thereof, provided with a plurality of rectangular apertures not shown, and for the purpose described in connection with the above mentioned apertures. Rollers 77 and 78, similar to those previously mentioned, projecting into the apertures in the lower portions of the plates 67 and 68, drive belts 79 of felt or rubber, the inner runs of which are adapted to contact the outer edges of the web emerging from the heater. In order to positively and forcefully pack the layers of the advancing mass into extremely close contiguity as it advances, thus to assure substantially perfect union of the glue lines on contacting faces of the successive layers prior to the time the folded mass enters the heater 76, the shafts driving the rollers 77 and 78 are rotated at a lesser angular velocity than that of the rollers 71 and 72, whereby the lower layers of the advancing mass are decelerated and serve as an abutment against which the upper layers are urged compactingly. To achieve this end, the shaft of the reduction mechanism 74 terminates in a sprocket wheel 74a, the latter being drivingly connected by a sprocket chain 80 to a larger sprocket wheel 74b, which is operatively connected to the rollers 77 which in turn are drivingly connected to the rollers 78 by sprocket chains 77a. Consequently, the rollers 77 and 78 will be driven at a sufficiently slower speed than the rollers 71 and 72 to effect compression of the layers prior to and during their passage through the heater 76 to bring about the desired adhesion of the layers to each other.

In order to drive in synchronism all the aforedescribed mechanisms of the machine, including those enumerated through the stacking roller mechanism, two variable speed electrical motors 81 are mounted as shown and are connected by suitable conductor paths through a switch and synchronizing mechanism 82 to a source of electrical power, not shown. The leftward motor drives the sprocket chain 24, while the rightward motor drives the sprocket chain 56.

The lines of phenolic resin adhesive, cured in the diathermal heater, bring about a firm facewise union of the folded layers of paper, but only at and along these lines, now laterally spaced in the endwise direction of the web. Hence, the web emerges continuously from the lower end of the conduit as an integral, vertically compacted, layered mass. Although the lines thus united maintain the layers in the pack in facewise contact, giving it a laminated appearance, all the layers are actually separate, except at these lines. The pack is hence adapted for subsequent expansion into honeycombed form.

Because of the staggering of the incisions in adjacent lines of slits, the adjacent layers of the pack are easily separable to expand the pack into a honeycomb core without necessitating trimming, grinding, or otherwise removing the longitudinal edges of adjacent folds, as in the prior practice.

Removal of the web from the machine at this state thus provides an article that, although compacted for enabling small-space transportation and storage, is actually a potentially honeycombed, multi-cellular web or foraminous reticule. Accordingly, if desired, the machine may be provided with means whereby the web may be severed and removed therefrom at this juncture, the machine for impregnating and expanding the pack into a core, and laminating it with facing sheets, being located at the point of destination or use of the unexpanded web.

In the normal operation of the machine and method, however, referring now to Figure 3, the pack aforedescribed is immediately passed through a conditioning zone comprising, in the present embodiment, three diagonally arranged, vertically separated breaker rollers 83. Although these rollers can be driven through the reduction mechanism 74 in the illustrated form of the machine the rollers are mounted in the frame of the apparatus for free or idling rotation under the rotatory motion applied thereto by the onwardly advancing web. The effect of this operation is shown in Figure 3 at the upper breaker roller. The folds at the outer periphery of the onwardly advancing packed mass are separated for at least half of the depthwise extent of the pack, from front edge to rear edge, by virtue of the circumferential stretching thereof around the roller. Thereby, any small adhesive portions that may have overflowed the desired lines of union of the layers are broken apart and the layers are fully separated to provide uniformity of expansion and equality of size in the subsequent hexagonal cells. Also, if the sheet material employed is stiff and has a high modulus of elasticity and resists stretching excessively, this stretch exerted on the fibers thereof will be sufficient to partially break the same down, thus conditioning the paper for subsequent expansion and permanent deformation of the cells into honeycomb form. Passage of the web through this zone is facilitated by oppositely disposed, vertically separated come-along rollers 85, these rollers bearing on at least one end thereof sprocket wheels 86 engaged by a sprocket chain 87 moving in the direction of the arrows.

From this station, the conditioned web is entrained into an expanding and impregnating zone including a pair of hold-back rollers 88 of relatively large diameter and so positioned with respect to each other and to the advancing web as to direct the latter in a sharply-curved, double reversed path, whereby to apply an unusually large amount of friction to the edges of the web, spreading the friction, however, over a large area.

The forward hold-back roller 88 rotates at the same speed as the rollers 85 and is preferably disposed in the upper portion of a sump or tank 89, near the rear wall thereof. Near the opposite wall of the sump are disposed come-along rollers 90 rotated at a much higher speed than rollers 88. In this embodiment the two rollers 90 are adapted to be driven at an angular velocity of the order of forty-five times greater than that of the rollers 88, as by means of chain 91 driven through a gear box 92, the ratio-gears of which are in turn driven by a variable speed electrical motors 93 driving the aforementioned sprocket chain 87.

The come-along rollers 90, like the hold-back rollers 88, are also of unusually large diameter and are otherwise so designed as to provide a large bearing surface against the advancing web. The rollers 90 are, moreover, so positioned with respect to each other and to the advancing web as to direct the latter in a sharply-curved, double reverse path. Thus, they apply a large amount of friction to the web but spread this friction over a greatly extended area.

Thus the leading end of the web is advanced much faster than the trailing end and to a differential extent and for a time sufficient to expand the folds of the web to form substantially hexangular cells which will take a permanent set. It may be desirable to expand the folded web in a series of stages rather than the one operation shown and this may be done by passing the unexpanded web through a series of rollers the speeds of which progressively increase.

It is to be understood, also, that the expansion ratio of the web need not necessarily be 45 to 1, which is merely a typical value, but may be varied between limits of about 2 to 1 and about 100 to 1. The lower limits provide a multicellular core characterized by high compressive strength, while the upper limits will obviously produce a greater length of core from a given length of paper, having a lower compressive strength. To achieve these expansion limits, the ratio-gears of the gear box may be shiftable in order to vary, as desired, the angular velocity of the come-along rollers 90.

In order to render the paper impervious to moisture and to protect the same against certain insects and animals as well as to render the cells of the web more rigid, the invention contemplates that the paper be impregnated with a material suitable for this purpose, such as a thermosetting phenolic resin. In the illustrated embodiment of the machine of the present invention the impregnation occurs in an impregnating station congruent with the expanding station, and to this end, the tank 89 is maintained with a quantity of the liquid chosen sufficient to insure that the expanding web is completely immersed in the liquid during its passage through the tank. It is to be understood that the paper may be impregnated at any stage of the process. In fact the paper can be actually impregnated before it is formed into the roll 20. Means 93, here shown as a plurality of air nozzles provided for positively removing surplus impregnating material from the cell walls, is mounted above the horizontally moving portion of the web after it has passed through the tank, so that the surplus will be forced through the now expanded web into a drain 94 leading to the tank.

Adjacent the rightward edge of the tank is provided a vertically spaced pair of come-along rollers 95, disposed to advance the impregnated web horizontally at a relatively rapid rate, being driven at the same angular velocity as the rollers 90 and by the same sprocket chain that drives these high speed rollers.

After the impregnated web has passed through the come-along rollers 95 it passes, referring now to Figure 4, to an oven or heater 96, disposed to surround the advancing web. This oven or heater may be of any type desired as long as it develops sufficient heat to evaporate the solvent from the phenolic resin impregnating the cell walls, the vapors being vented therefrom by means of a suitable vent pipe or the like. The web undergoing heating is advanced through this heater at a rapid rate by means of vertically spaced come-along rollers 97, horizontally mounted adjacent the rightward end of the heater 96.

The reticulate web is now in the expanded condition shown in Figure 10 as a core, and remains in that form without the aid of compression resisting backing sheets on either face, contrary to the prior art. The core is resilient and can be lengthwise compressed into a pack similar to that described hereinabove. This pack can be maintained compressed and restrained from expanding, as by means of removable bands encircling same; and can then be shipped or stored in the minimum amount of space. Upon arrival at its destination, it readily expands to substantially its original lengthwise dimensions upon removal of the restraining bands.

By virtue of the lines of slits shown in Figure 9, and formed along the edges of the folds and the relative staggering of the slits in the opposite longitudinal fold edges of the fan-folded article, when the pack of Figure 9 is expanded there is provided a honeycombed element shown in Figure 12, in which there are rows of uniform open ended flattened hexagonal cells extending perpendicularly to the opposite faces of the element, each flattened hexagonal cell varying in width from infinitely small at each of the opposite elongate ends thereof to a predetermined maximum intermediate said ends. The cells of each row are staggered with respect to the cells of the next adjacent row, so that the cells of alternate rows lie transversely and longitudinally in alignment. The cells of alternate rows opening onto the one face of the honeycomb, as shown in Figure 12, are joined by tabs T formed of the unincised portions of the web at a point intermediate the ends thereof, here shown as at their maximum width. As the incisions are staggered laterally, the cell walls of these alternate rows at the opposite face of the honeycomb are not joined by tabs; instead, the intervening rows of cells are joined by tabs.

There is thus provided a one piece honeycombed element consisting of a single, integral web of material, since all the folds remain united to each other by the tabs formed by the unincised portions of the web.

To meet the contingency that the successive lengthwise layers of the web may not have their cell ends, in one or the other faces of the web, lying in absolute uniplanarity, that is, that the fold lines may be "crept" accumulatively due to slight de-synchronization of the slitting rollers or vertical displacement thereof because of wear in their bearings, so that the slit lines fail to run at right angles to the opposite edges of the advancing web, means may be provided onwardly adjacent the heater for facing the web by removing any protruding portions from each face to reduce the cell ends in each face to uniplanarity. The facing means is driven by a variable speed electric motor 98 mounted on the framework of the apparatus adjacent the advancing web in this region. This motor includes a sprocket wheel 99 driving a sprocket chain 100 which in turn drives in the now preferred embodiment of the invention transversely extending, longitudinally spaced facing-rollers 101. These rollers are preferably sanding rollers or other abrasive rollers although any means can be used for facing the cell ends to render the same uniplanar. These rollers are adapted to be driven at equal angular velocities in contact with the opposite faces of the advancing web, removing all protuberances and, incidentally, removing the tabs connecting adjacent layers at their front and rear edges, thus reducing each of the opposite faces of the web to uniplanarity. A plurality of feed rollers 102 alternating with the abrading rollers is employed to advance the web through this zone, the feed rollers being so positioned respectively with reference to the abrading rollers as to simultaneously serve as back-up rollers for the abrading action while guiding and supporting the web being abraded in this station.

The web now passes into a routing operation in which may be cut in either or both faces of the web, longitudinally and transversely extending grooves for receiving the inturned opposite edges of the longitudinally or transversely elongate facing sheets for covering the longitudinally or transversely elongate segments of the web. In order to expedite and facilitate the formation of these transverse and longitudinal grooves, the invention contemplates that such rapidly functioning cutting means as routers be employed in this zone for grooving the advancing web.

By way of example, a router for grooving one face of the web is representationally shown at 103 as comprising a conventional rotary horizontal cutter type router mounted for longitudinal movement in step with the longitudinal motion of the web, and also mounted for movement transversely thereof while translating longitudinally therewith. Any suitable conventional means may be employed for mounting the router spindle to permit it to either remain stationary and cut longitudinal grooves or travel with the web and cut transverse grooves therein, same being diagrammatically illustrated as comprising a supporting table mounted on rollers to be forwardly translated by and with the web, and a pair of overhead rails on which the router motor and spindle are laterally translatable.

In order to prepare the faces of the web, that is, each cell end, for bonding to the facing plates, the web is next advanced into a zone where a bonding material such as a thermoplastic adhesive phenolic resin is applied to the web, and preferably only to the outer edges of each of the cell ends in the form of continuous lines of beading. Means for applying this adhesive are, by way of example only, shown as comprising an annular casing 104 surrounding the advancing web and housing two vertically spaced banks of spraying nozzles 105 directed oppositely towards the web, one bank of nozzles being mounted in the upper portion of the casing and the other bank being mounted in the lower portion of the casing. The bonding material can be applied in any manner found desirable, for instance, applicator rollers could be substituted for the nozzles shown.

The phenolic resin adhesive preferably consists of a powdered material carried in a volatile dispersant, and the latter must be removed in order to passivate or dry the adhesive so that the succeeding operations can be performed on the adhesive bearing article without gumming the operating mechanisms or damaging the cells. To this end, the web, bearing the cell end beadings of tacky adhesive is next passed through a heater 106. In this heater the dispersant is rapidly evaporated from the adhesive while the web is moving full speed forwardly therethrough, leaving on the cell ends beadings of the dried powdered phenolic residue bonded thereto. Since this adhesive is heat responsive in that condition, it is ready for bonding with a similar adhesive later applied to the inner faces of the metal facing sheets.

The invention contemplates the output of the foraminously reticulate article in substantially any desired planiform shape and size. However, the present embodiment is chiefly concerned with the production of polygonal planiform cores, and to achieve this end, referring now to Figure 5, the web is advanced from the heater 106 into a subdividing zone in which the web is separated while moving, into longitudinally elongate or transversely elongate sub-multiples, by suitable cutting means. These means include lengthwise subdividing means such as a rip saw 107 and breadthwise subdividing means such as a cross cut saw 108. The rip saw comprises a plurality of circular blades mounted on a shaft lying underneath the web, the shaft being adapted to be rotated by a variable speed motor 107a. The cross cut saw comprises a transversely extending, electrically driven circular blade 108 mounted normally to lie over the top of the advancing web, the saw and motor therefor being supported on a table 109 movable longitudinally rightwardly with the advancing web with the cut off saw concurrently operating transversely into the web to sever same rectangularly while the same is advancing. A trigger or actuator 110 is provided at the far end of the movable table and is suitably connected to the motor switch, and is so disposed in the path of the advancing web that the forward end strikes the trigger and thereby energizes the motor and starts the cross cut saw. The trigger is settable at various distances from the saw to provide for cutting off various lengths of web.

A severing means such as the saw 108, although not shown to simplify illustration of the invention, is intended to be used wherever a commercially acceptable product has been completed, as at the exit of the stacking mechanism 66, at the exit of the oven 96 and at other similar stations on the machine.

The honeycombed paper core produced by the present method and apparatus is characterized by the substantially complete uniformity of the cells in their dimensions and shapes, since no two layers of the paper contact at any point except the accurately indexed lines of adhesive. The web is thus rendered isotopic in the depthwise direction so that the core is homogeneous as to compression resistance and as to heat insulating properties as well. By decreasing the index spacing of these adhesive lines, the cell size may be decreased and their number correspondingly multiplied whereby substantially to increase the heat insulating properties thereof. Neither the bonding adhesive nor the rigidifying and protective material occupies any portion of the cell volume, so that the heat insulating properties of the web are further enhanced and rendered more homogeneous. The bonding adhesive is confined substantially to the outermost edges of the opposite ends of the cells in the form of lines of beading extending therealong.

At this state of the method, the web has taken the form of a complete multi-cellular core permanently expanded longitudinally, impregnated with protective and rigidifying material and facewise coated with the bonding adhesive. It is hence ready for the union thereto, facewise, of the metal, or other, facing sheets, in order to provide as the end product of the presently disclosed embodiment of the invention, a laminated constructional panel or slab. To this end, there is provided a branch assembly line apparatus transversely feeding at its forward terminus into the main line of operations for the purpose of automatically applying these sheets to the core.

As shown in Figure 6, in side elevation, and in Figure 7, in plan, this apparatus consists of supporting and advancing rollers 111, driven clockwise and supporting the two facing sheets 112 in parallelism and in vertically spaced relationship. Extending longitudinally between the spaced sheets, is a nozzle type spraying device adapted to spray an adhesive, such as a thermo-setting phenolic resin, dispersed in a solvent, over the entire area of each of the inner faces of the sheets as they advance. It has been found that a superior bond is effected if the faces of the sheets 112 receiving the bonding material are given a clean, roughened surface such as had by placing the sheets in a chromic acid bath or the like.

The sheets 112 are advanced thence on other rollers 111 into a heated zone constituted by a heater 113. However, it is to be noted that the upper rollers 114 in this heater are constructed with knife edges to reduce the line of contact thereof with the sheets to a minimum. In this heater, the solvent is evaporated, leaving the dry heat responsive resin bonded to the sheet whereby to facilitate the further handling and contact of the sheets without removing any of the adhesive.

From the heater 113, the sheets pass forwardly into a transfer mechanism 115 for shifting the sheets, while vertically spaced in the aforesaid relationship, into the main line in a core-contacting position. This transfer mechanism is diagrammatically shown as comprising a series of rollers 116 mounted on transversely extending axes in longitudinally spaced relationship, the roller axes 117 being carried in a sheet guiding and checking frame 118 not shown in Figure 6 for the sake of clarity but shown in Figure 7. The roller shafts are driven at the desired speed by some suitable driving mechanism not shown. The rollers 116 support the lower sheet, coated with adhesive on its inner surface, and translate it bodily across the space intervening between the sheet receiving station of the main assembly line and the branch operating line. The upper sheet is, when it reaches the frame 118, engaged by a lifting means comprising a plurality of vacuum cups 119 suspended from a travelling crane, not shown, or transported thereover by similar means, so that the dry adhesive covered inner face of the upper sheet is prevented from contacting any intervening object, precluding the loss of this adhesive from any spot on this face.

The sheets are delivered to a layering station in the main assembly line with their adhesive bearing lengths extending longitudinally of the main line in parallelism to the path of the advancing web, lying vertically spaced above and below the web. When the leading end of a web segment arrives at the layering station, it strikes two electrical switch arms 121 and 122. Arm 121 halts the transverse movement of the lower sheet and also checks the advance of the web segment and concurrently aligns it longitudinally and laterally with the lower face of the web. Arm 122 releases the vacuum from the vacuum cups and aligns the upper sheet congruently with the upper face of the web.

When all the edges of the web are accurately aligned with the corresponding edges of the facing sheets, the arms of the switches 121 and 122 fall angularly out of the path of the core segment to ensue. This ensuing segment then urges the layered core and sheets forwardly into a heat and pressure applying means 123 adapted to bond the core and the sheets into a finished laminated panel or slab. From the device 123, the paper and metal or Masonite automatically emerge in the form of a honeycombed paper core adhesively facewise bonded to planar sheets of facing material.

The means 123 may take the form of a ram 124 provided with diathermal heating means, the leads of which are indicated at 125 and a diathermal heating platen 126. In any event, the heat means must be one which will heat the core to a temperature sufficient to cure the material impregnating the same, for it is now preferred to cure this material at the same time the sheets are bonded to the opposite faces of the core. It is to be understood, however, that the impregnated core can be cured prior to the bonding step if desired. The time devoted to curing the impregnated core and heat bonding the sheets to the core in this manner is predeterminately limited to a period no longer than necessary for the ensuing segment to reach the ends of the layering zone, be layered, and automatically advanced to the device 123, its advent automatically elevating the ram of the device 123 to receive the layered article. It is obvious that a multiplicity of means 123 may be necessary particularly where the rate at which the core is formed is relatively rapid.

This application is a continuation-in-part of our co-pending application, Serial No. 742,618, filed April 19, 1948, now abandoned.

Although the now preferred embodiment of the method and machine of the present invention and the article produced thereby have been shown and described herein, it is to be understood that the invention is not to be limited thereto, for it is susceptible to changes in form and detail within the scope of the appended claims.

We claim:

1. The method of making a multi-cellular, multi-layered article from a web, including: advancing the web into the zone of operations; applying to opposite faces of the advancing web longitudinally extending lines of layer-unitable material with the lines on the one face laterally spaced in staggered relationship to the lines on the opposite face; forming transversely extending lines of slits in the advancing web at longitudinally equidistant stations thereof with the slits in adjacent rows mutually, laterally staggered; folding the advancing web alternately in opposite directions on said lines of slits; and stacking the folds contiguously to unite the same on said lines of material as said folded web is continuously advancing to form the web into a depthwise and breadthwise multi-cellular, lengthwise compact fan-folded article.

2. The method of making a multi-cellular, lengthwise multi-layered article from a web, including: advancing the web into the zone of operations; applying to opposite faces of the advancing web longitudinally extending lines of a cold-setting adhesive with the lines on the one face laterally spaced in staggered relationship to the lines on the other face; forming transversely extending, longitudinally equidistant lines of slits in the advancing web with the slits in adjacent lines mutually laterally staggered; folding the advancing web on said lines of slits alternately in opposite directions; stacking the folds contiguously to unite same on said lines of material as said web is advancing to form a depthwise and breadthwise multi-cellular, lengthwise compact, fan-folded mass; and thereafter severing the thus-processed mass from the web to form an article.

3. The method of making a multi-cellular, multi-layered article from a web, including: advancing the web into the zone of operations; applying to oppostie faces thereof, longitudinally extending lines of a heat-responsive adhesive with the lines on the one face laterally spaced in staggered relationship to the lines on the opposite face; forming transversely extending, longitudinally equidistant lines of slits in the advancing web with the slits in adjacent lines mutually laterally staggered; folding the web alternately in opposite directions on predetermined, transversely extending, longitudinally equidistant lines thereof; stacking the folds contiguously to bring about engagement of said adhesive lines as said folded web is advancing to form a fan-folded mass; heating the stacked folds while the same are advancing, to activate the adhesive, and unite the folds along said lines to form a lengthwise compact, depthwise and breadthwise multi-cellular fan-folded mass; and thereafter severing the thus-processed advancing mass from the rest of the web to form an article.

4. The method of making a constructional member from a web, including: advancing the web into the zone of operations; applying to opposite faces of the advancing web, longitudinally extending lines of uniting-material with the lines on the one face laterally spaced in staggered relationship to the lines on the opposite face; incising the advancing web with transversely extending longitudinally equidistantly spaced lines of slits, the slits in adjacent lines being mutually laterally staggered; folding the advancing web alternately in opposite directions on said lines of slits; stacking the folds contiguously to unite same on said lines of material as said folded web is advancing and form the web into a longitudinally compact, depthwise and breadthwise multi-cellular fan-folded mass; temporarily advancing the leading end of the folded web sufficiently faster than the trailing end to separate the folds and to enlarge the cells to an extent sufficient to cause the same to take a permanent set in an at least partially expanded condition; and thereafter severing the expanded portion from the remainder of the web.

5. The method of making a structural member, comprising the steps of: advancing a web of suitable material into the zone of operations; incising the advancing web with transversely longitudinally equidistantly spaced lines of slits, the slits in adjacent lines being mutually laterally staggered; folding the advancing web alternately in opposite directions on transversely extending longitudinally equidistant predetermined lines; advancing the folded web while stacking the folds contiguously to form the web into a fan-folded mass; uniting each face of a fold to the adjacent face of the contiguous fold along a series of depthwise extending lines laterally spaced in staggered relationship to the lines of union between the opposite face of the fold and the adjacent face of the contiguous fold to form a depthwise and breadthwise multi-cellular lengthwise compact article; expanding said article to form a depthwise foraminous reticule; impregnating the material of said reticule with a rigidifying preservative; and bonding to each face of said reticule a facing member of sheet material.

6. The method of making a permanently expanded, depthwise foraminous, moisture and pest-resistant, semi-rigid reticule from a web, including: advancing the web into the zone of operations; applying to opposite faces of the advancing web, longitudinally extending lines of uniting-material with the lines on the one face laterally spaced in staggered relationship to the lines on the opposite face; incising the advancing web with transversely extending longitudinally equidistantly spaced lines of slits with the slits in adjacent lines mutually laterally staggered; folding the advancing web alternately in opposite directions on predetermined transversely extending, longitudinally equidistanct lines thereof; advancing the folded web while stacking the folds contiguously to unite the same on said lines to form the web into a longitudinally compact, depthwise and breadwise multi-cellular fan-folded mass; expanding the folded web to separate the folds between said fold uniting-lines to form the web into a depthwise foraminous reticule while concurrently applying a web-preserving and strengthening material to the expanding folds; heating the advancing impregnated web to dry said impregnating material; and severing said reticule portion from the rest of the web.

7. The method of making from a web, a depthwise foraminous reticule adapted to receive facewise, facing sheets having longitudinally or transversely extending edge-formations, including: advancing the web into the zone of operations; applying to opposite faces thereof, longitudinally extending lines of uniting material with the lines on the one face laterally spaced in staggered relationship to the lines on the opposite face; incising the advancing web with transversely extending longitudinally equidistantly spaced lines of slits with the slits in adjacent lines mutually staggered laterally; folding the advancing web alternately in opposite directions on said lines of slits; stacking the folds contiguously to unite same on said lines of said uniting material, while advancing the folds, to form the web into a compact, depthwise, multi-cellular fan-folded mass; expanding the mass sufficiently to form a deformation-set, lengthwisely expanded, depthwise foraminous reticule; reducing the opposite faces of the reticule to uniplanarity; removing transverse or longitudinal portions from opposite faces of the advancing foraminous reticule sufficient in extent to provide accommodation for congruent portions of their facing sheets; severing the so-processed reticule from the remainder of the web; and bonding to each face of said reticule a facing member of sheet material.

8. The method of making from a web, a depthwise foraminous reticule adapted to facewise receive a pair of facing sheets each having longitudinally and transversely extending edge-formations thereon, including: advancing the web into the zone of operations while applying to opposite faces thereof, longitudinally extending lines of a thermo-setting adhesive with the lines on the one face laterally offset in staggered relationship to the lines on the opposite face; incising the advancing web with transversely extending longitudinally equidistantly spaced lines of slits with the slits in adjacent lines mutually laterally staggered; folding the advancing web alternately in oposite directions on said lines of slits stacking the folds contiguously as the same are advancing to form the web into a depthwise and breadthwise multi-cellular compact fan-folded mass; heating said fan-folded mass to unite said folds on said lines of adhesive and form a depthwise foraminous reticule; expanding said fan-folded mass; impregnating the plies of the expanded mass with a web protecting and strengthening material; drying the impregnated foraminous reticule; reducing the opposite faces of said reticule to uniplanarity; routing transverse and longitudinal grooves in the opposite faces of the reticule sufficient in extent to accommodate the edge formations of said facing sheets; severing the thus processed foraminous reticule from the rest of the web; and bonding to each face of said reticule a facing member of sheet material with said formations fitting into said grooves.

9. The method of making a laminated structural panel from a web and a pair of facing-sheets, including: advancing the web into the zone of operations; applying to opposite faces of the advancing web, longitudinally extending lines of web-fold uniting material with the lines on the one face laterally spaced in staggered relationship to the lines on the opposite face; incising the advancing web with transversely extending longitudinally equidistantly spaced lines of slits with the slits in adjacent lines in staggered relationship to each other; folding the web alternately in opposite directions on said lines of slits; stacking the folds contiguously to unite the same on said lines of uniting material to form the web into a fan-folded compact, depthwise and breadthwise multi-cellular mass; expanding the cells of the so-processed mass to an extent sufficient to form a depthwise foraminous reticule; impregnating the walls of the expanded cells with a web protective and strengthening material; abrading the opposite faces of said foraminous reticule sufficiently to reduce each face to uniplanarity; severing the so-processed portion from the remainder of the web; facewise-bonding facing sheets to opposite faces of the foraminous reticule; and removing the laminated panel from the operating zone.

10. The method of making a laminated, honeycomb-cored structural panel from a web and a pair of facing sheets, including: advancing the web into the zone of operations; applying to opposite faces thereof, longitudinally extending lines of a thermo-setting adhesive with the lines on the one face laterally offset in staggered relationship to the lines on the opposite face; incising the advancing web with transversely extending longitudinally equidistantly spaced lines of slits with the slits in adjacent lines mutually laterally staggered; folding the web alternately in opposite directions on said lines of slits; stacking the folds contiguously to form the web into a fan-folded mass; heating the stack to activate the contacting lines of adhesive and unite the folds along said lines to form a compact, depthwise and breadthwise multi-cellular mass; slightly expanding the compact mass longitudinally and laterally intermediate the lines of adhesive to condition the mass for permanent expansion lengthwise of the mass; advancing the one end of the conditioned multi-cellular mass faster than the other end to expand and enlarge the cells; impregnating the mass with a web protective and strengthening material; heating the expanded mass to dry said impregnating material to fix the mass in said expanded condition; abrading the opposite faces of said expanded mass sufficiently to reduce the said faces to uniplanarity; applying bonding material to the edges of the opposite ends of each cell wall; heating the article sufficiently to dry the bonding material; applying facewise to the opposite faces of said expanded mass facing material coated with a bonding material on the inner faces thereof; and thereafter bonding the said facing material to the opposite faces of said mass.

11. The method of making a multi-cellular, multi-layered pack from a web, comprising: advancing the web into the zone of operations; applying to opposite faces of the advancing web longitudinally extending lines of adhesive with the lines on the one face laterally spaced in staggered relationship to the lines on the opposite face; incising the advancing web with transversely extending, longitudinally equidistantly spaced lines of slits so mutually laterally staggered in each pair of successive, adjacent lines of slits that the slits in the one of said adjacent lines are bisected by the adhesive lines on the one face of said web, and so that the slits in the other line of said pair are bisected by the adhesive lines on said opposite face; and folding said advancing web alternately in opposite directions on said lines of slits to unite said folds on said lines of adhesive and form said web into a depthwise and breadthwise multi-cellular, lengthwise compact pack.

12. The method of making a multi-cellular, multi-layered pack from a web, comprising: advancing the web into the zone of operations; applying to opposite faces of the advancing web longitudinally extending lines of adhesive with the lines on the one face laterally spaced in staggered relationship to the lines on the opposite face; incising the advancing web with transversely extending, longitudinally equidistantly spaced lines of slits so mutually laterally staggered in adjacent lines of slits that each of said slits in the one of said adjacent lines intersects the adhesive lines on the one face of said web and is spaced longitudinally from the longitudinally adjacent end of the next adjacent slit a distance only slightly greater than the width of adhesive lines on the opposite face, said lines being also so staggered that each of said slits in the other of said adjacent lines intersects the adhesive lines on said opposite face and is spaced longitudinally from the longitudinally adjacent end of the next adjacent slit a distance only slightly greater than the width of the adhesive lines; folding said advancing web alternately in opposite directions on said lines of slits to unite said folds on said lines of adhesive and form said web into a depthwise and breadthwise multi-cellular, lengthwise compact pack.

13. A method of making a honeycomb element from an expandible, multi-layer, multi-cellular pack of relatively low depthwise compressive strength, comprising: passing the one lengthwise end of the pack onwardly through a sharply double-reverse curved path and against and around rotary members having a relatively high rate of rotation and a relatively large frictional area and located at the centers of said curves, thereby to wrap said end of said element partially around said rotary members and set up an amount of frictional engagement necessary to relatively rapidly advance said pack without compressively distorting the cells thereof; and passing the opposite lengthwise end of said pack at a predetermined speed less than the first-said speed through a sharply double-reverse curved path and against and around rotary members having a relatively large frictional area and located at the centers of said curves, thereby to wrap the last-said end around said rotary members and set up an amount of frictional engagement necessary to relatively retard the last-said end of said element; whereby to expand said continuously advancing pack into honeycomb form without compressively distorting the cells thereof.

14. The method of making a multi-cellular, multi-layer pack from an integral sheet of material lengthwise bearing adhesive lines laterally staggered on opposite faces thereof, comprising: incising the web with a plurality of transversely extending, longitudinally equidistantly spaced lines of incisions mutually staggered laterally in adjacent lines with the incisions in the one of said adjacent lines intersecting the adhesive lines on the one face of said web and with the incisions of the other of said adjacent lines intersecting the adhesive lines on the opposite face of said web; and zigzag folding said web on said lines of incisions in that direction which on the first folding leaves the lines of adhesion on the surfaces that join the contiguous faces of the zig and zag folds uninterrupted by incisions at the included fold edge; and stacking said folds compressionally to unite same on said lines to form the web into a longitudinally compact, depthwise and breadthwise multi-cellular mass.

15. Apparatus for manufacturing from a continuous web a multi-cellular, multi-layer pack, including: means at the input end of the apparatus for supporting a supply of the web material; means operatively associated therewith for advancing the web therefrom; means operatively associated with the opposite faces of the advancing web for applying to opposite faces of the advancing web, longitudinally extending lines of an adhesive with the lines on the one face relatively spaced in staggered relationship to the lines on the other face; means for incising the advancing web in transversely extending, longitudinally equidistant, lines of slits with the slits in adjacent lines so mutually staggered laterally that the slits in one of said adjacent lines of slits are bisected by the lines of adhesive on one face of said web and the slits in the other of said adjacent lines are bisected by the lines of adhesive on the other face of said web; means for folding the advancing web alternately in opposite directions on said lines of incisions; means disposed onwardly of said advancing and folding means for stacking the folds contiguously to unite the same in the first said lines to form a depthwise and breadthwise multi-cellular, longitudinally compact mass; and means for severing the thus-produced mass from the web.

16. Apparatus for manufacturing from a continuous web, a multi-cellular, multi-layer pack, including: means at the input end of the apparatus for supporting a supply of the web, means for applying to opposite faces of the advancing web longitudinally extending lines of uniting material with the lines on the one face relatively spaced in staggered relationship to the lines on the other face; means for incising the advancing web in transversely extending, longitudinally equidistant lines of slits with the slits in adjacent lines so mutually staggered laterally that the slits in one line of said adjacent lines are bisected by the lines of uniting material on one face of the web and the slits in the other line of said adjacent lines are bisected by the lines of uniting material on the opposite face of the web; means for folding the advancing web alternately in opposite directions on said lines of slits; means for indexedly stacking the folds contiguously to effect mutual facewise contact of the fold-segmented lines of uniting material lying on adjacent faces of the contiguous folds; means in said stacking means for applying pressure substantially perpendicularly to the faces of the contiguous folds to unite same into a compact depthwise multi-cellular, multi-layer mass; and means for severing the thus-produced mass from the web.

17. Apparatus for manufacturing from a continuous web a multi-cellular, multi-layer pack, including: means at the input end of the apparatus for supporting a supply of the web material; means for advancing the web therefrom and forwardly of the apparatus; means for applying to opposite faces of the advancing web, longitudinally extending lines of thermo-setting adhesive with the lines on the one face relatively offset in staggered relationship to the lines on the opposite face; means for incising the advancing web in transversely extending, longitudinally equidistant lines of slits with the slits in adjacent lines so mutually staggered laterally that the slits in one of said adjacent lines of slits are bisected by the lines of adhesive on one face of said web and the slits in the other of said adjacent lines are bisected by the lines of adhesive on the other face of said web; means for folding the sheet alternately in opposite directions on said lines of slits; means disposed onwardly of said advancing and folding means for stacking the folds to effect mutual contact of the lines of adhesive; means surrounding said stacked web for heating the stacked web while same is advancing to activate the adhesive and unite the folds along said lines; and means for severing the thus-produced mass from the remainer of the web to form a pack.

18. Apparatus for manufacturing from a continuous web, a flattened multi-cellular, multi-layer article preconditioned for expansion into honeycomb form, including: means at the input end of the apparatus for supporting a supply of the web material; means for advancing the web therefrom and forwardly of the apparatus; means disposed adjacent opposite faces of the web for applying to opposite faces of the advancing web, longitudinally extending lines of uniting material with the lines on the one face laterally spaced in staggered relationship to the lines on the opposite face; means for incising the advancing web in transversely extending, longitudinally equidistant lines of slits with the slits in adjacent lines so mutually staggered laterally that the slits in one line of said adjacent lines are bisected by the lines of uniting material on one face of the web and the slits in the other line of said adjacent lines are bisected by the lines of uniting material on the opposite face of the web; means for folding the web alternately in opposite directions on said lines of slits; means disposed onwardly of said advancing and folding means for stacking the folds to contact same on said uniting material lines and form the web into a fan-folded, longitudinally compact, depthwise multi-cellular mass; means adjacent each lengthwise face of the advancing mass for subjecting the one peripheral half of the mass to tensile forces sufficient to slightly separate the layers of said one half for at least half of the depthwise dimension of said stack intermediate said uniting lines and to break down the web-fibers therein; means for subjecting the other peripheral half of the stack to tensile forces sufficient to slightly separate the layers of said other half and to break down the web fibers therein; and means for severing the thus-processed portion from the remainder of the web.

19. Apparatus for manufacturing from a continuous web, a fully-honeycombed article, including: means at the input end of the apparatus for supporting a supply of the web material; means for continuously advancing the web therefrom forwardly of the apparatus; means for applying to opposite faces of the advancing web, longitudinally extending lines of uniting material with the lines on the one face relatively spaced in staggered relationship to the lines on the opposite face; means for incising the advancing web in transversely extending, longitudinally equidistant lines of slits with the slits in adjacent lines so mutually staggered laterally that the slits in one line of said adjacent lines are bisected by the lines of uniting material on one face of the web and the slits in the other line of said adjacent lines are bisected by the lines of uniting material on the opposite face of the web; means for folding the sheet alternately in opposite directions on said lines of slits; means for stacking the folds to effect union of the same on said lines of uniting material to form the web into a fan-folded, longitudinally compact depthwise and breadthwise multi-cellular mass; means for advancing a leading portion of the advancing mass sufficiently faster than a trailing portion to effect enlargement of the cells thereof transversely to their major axes; and means for severing the thus-expanded portion from the remainder of the web.

20. Apparatus for manufacturing from a continuous web, a fully honeycombed deterioration-resistant and semi-rigidified article, including: means at the input end of the apparatus for supporting a supply of the web material; means for continuously advancing the web therefrom and forwardly of the apparatus; means for applying to opposite faces of the continuously advancing web, longitudinally extending lines of uniting material with the lines on the one face laterally spaced in staggered relationship to the lines on the opposite face; means for incising the advancing web in transversely extending, longitudinally equidistant lines of slits with the slits in adjacent lines so mutually staggered laterally that the slits in one line of said adjacent lines are bisected by the lines of uniting material on one face of the web and the slits in the other line of said adjacent lines are bisected by the lines of uniting material on the opposite face of the web; means for folding the sheet alternately in opposite directions on said lines of slits; means for stacking the folds to unite the same on said uniting lines to form the web into a fan-folded, longitudinally compact, depthwise multi-cellular mass; means disposed at opposite lengthwise ends of the advancing mass for lengthwise expanding the so-produced mass transversely of major axes of the cells to form a depthwise foraminous reticule; means disposed around said expanding mass for concurrently impregnating the walls of the cells during said expansion with a web protective and strengthening material; and means disposed at the trailing portion of the so-processed reticule for severing the so-processed reticule from the remainder of the web.

21. Apparatus for manufacturing from a continuous web a fully honeycombed article having uniplanar opposite faces adapted to fit facing sheets congruently, including: means at the input end of the apparatus for supporting a supply of the web material; means for advancing the web therefrom forwardly of the apparatus; means for applying to opposite faces of the advancing web, longitudinally extending lines of uniting material with the lines on the one face laterally spaced in staggered relationship to the lines on the opposite face; means for incising the advancing web in transversely extending, longitudinally equidistant lines of slits with the slits in adjacent lines so mutually staggered laterally that the slits in one line of said adjacent lines are bisected by the lines of uniting material on one face of the web and the slits in the other line of said adjacent lines are bisected by the lines of uniting material on the opposite face of the web; means for folding the sheet alternately in opposite directions on said lines of slits; means disposed onwardly of said advancing and folding means and connected thereto for stacking the folds to contact same on said uniting lines and form the web into a fan-folded, longitudinally compact depthwise multi-cellular mass; means at opposite lengthwise ends of the advancing mass for lengthwise expanding the so-produced mass transversely of the major axes of the cells to form a depthwise foraminous reticule; means for impregnating the walls of each advancing cell with a web-protective and strengthening material; means for abrading the opposite lengthwise faces of said reticule sufficiently to reduce each face to uniplanarity; and means for severing the so-produced reticule from the remainder of the web.

22. Apparatus for manufacturing from a continuous web, a honeycombed core adapted for assembly with facing sheets therefor having edge joggles abutting same, including: means at the input end of the apparatus for supporting a supply of the web material; means for advancing the web therefrom forwardly of the apparatus; means for applying to opposite faces of the continuously advancing web, longitudinally extending lines of uniting material with the lines on the one face relatively spaced in staggered relationship to the lines on the opposite face; means for incising the advancing web in transversely extending, longitudinally equidistant lines of slits with the slits in adjacent lines so mutually staggered laterally that the slits in one line of said adjacent lines are bisected by the lines of uniting material on one face of the web and the slits in the other line of said adjacent lines are bisected by the lines of uniting material on the opposite face of the web; means for folding the sheet alternately in opposite directions on said lines of slits; means disposed onwardly of said advancing and folding means for stacking the folds to contact same on said uniting lines and form the web into a fan-folded, longitudinally compact, depthwise multi-cellular mass; means disposed at opposite lengthwise ends of the advancing mass for lengthwise expanding the so-produced mass transversely of the major axes of the cells to form a depthwise foraminous reticule; means for impregnating the walls of the cells of said reticule with a web-protective and strengthening material; means for abrading the opposite faces of said reticule sufficiently to reduce each of said faces to uniplanarity; means for forming transversely and longitudinally extending recessed portions in the opposite faces of the reticule sufficient in volume to provide accommodation for the joggles of facing sheets having edge joggles; and means for severing the so-processed reticule from the remainder of the web.

23. Apparatus for manufacturing from a continuous web, a honeycombed core adapted for bonding facewise to facing-sheets therefor to form a laminated panel, including: rotative means at the input end of the apparatus for supporting a roll of the web material; tensile means for advancing the web therefrom forwardly of the apparatus; adhesive bearing roller means disposed in sequence adjacent opposite faces of the web for applying to opposite faces of the continuously advancing web, longitudinally extending lines of adhesive with the lines on the one face relatively spaced in staggered relationship to the lines on the opposite face; knife means disposed adjacent opposite faces of the advancing web and operable successively in mutually laterally staggered relationship for forming in the advancing web transversely extending, longitudinally equidistant lines of slits with the slits in adjacent lines so mutually staggered laterally that the slits in one of said adjacent lines of slits are bisected by the lines of adhesive on one face of said web and the slits in the other of said adjacent lines are bisected by the lines of adhesive on the other face of said web; star-wheel means operatively associated with opposite faces of the advancing slitted web and including portions successively cooperable to displace successive portions of the advancing web alternately in opposite directions on said lines of slits thereby to fold the web alternately in opposite directions on said lines of slits; driven means disposed onwardly of said advancing and folding means for stacking the folds to contact same on said lines of adhesive to form the web into a fan-folded longitudinally compact, depthwise multi-cellular mass; friction-applying means disposed onwardly from said driven means at the trailing portion of the advancing mass for applying a hold-back force over a large area of said portion; friction applying means disposed at the leading portion of the advancing mass for applying a come-along force to the leading portion of the mass and advancing same faster than the trailing portion, whereby to lengthwise expand the mass transversely of the major axes of the cells to form a depthwise foraminous reticule; bath-means disposed around said expanding mass for impregnating the walls of the cells of the advancing reticule with a web protective and strengthening material; spraying means disposed adjacent opposite lengthwise faces of the advancing reticule for depositing a sheet-bonding material on the outer edges of the opposite ends of the cell walls; and saw means disposed transversely adjacent the one lengthwise face of the trailing portion of the advancing reticule for severing the so-processed foraminous reticule from the remainder of the web.

24. Apparatus for manufacturing from a continuous web, a honeycombed core adapted for heat-and-pressure bonding facewise to facing sheets therefor to form a laminated panel: including: roller means at the input end of the apparatus for supporting a roll of the web material; tensile means for advancing the web therefrom and forwardly of the apparatus; adhesive-bearing roller means disposed in sequence adjacent opposite faces of the web for applying to opposite faces of the continuously advancing web, longitudinally extending lines of adhesive with the lines on the one face laterally spaced in staggered relationship to the lines on the opposite face; knife means disposed adjacent opposite faces of the advancing web and operable successively in mutually laterally staggered relationship for forming transversely extending, longitudinally equidistant lines of slits in said advancing web with the slits in adjacent lines so mutually staggered laterally that the slits in one of said adjacent lines of slits are bisected by the lines of adhesive on one face of said web and the slits in the other of said adjacent lines are bisected by the lines of adhesive on the other face of said web; star-wheel means operatively associated with opposite faces of the advancing slitted web and including portions successively cooperable to displace successive portions of the advancing web alternately in opposite directions on said lines of slits thereby to fan-fold the web; driven means disposed onwardly of said advancing and folding means for stacking the folds to contact same on said lines of adhesive to form the web into a fan-folded depthwise multi-cellular mass; friction-applying roller means disposed onwardly from said driven means at opposite lengthwise portions of the advancing mass for advancing the leading portion thereof faster than the trailing portion and lengthwise expanding the mass at right angles to the major axes of said cells to form a depthwise foraminous reticule; bath-means for impregnating the walls of each advancing cell with a web-protective and strengthening material; spraying means disposed adjacent opposite lengthwise faces of the advancing reticule for depositing a thermo-responsive adhesive on the outer edges of the opposite ends of the cells; means surrounding the advancing so-treated reticule for heating the reticule to passivate the adhesive; and saw-means disposed transversely adjacent the one lengthwise face of the trailing portion of the advancing reticule for severing the so-treated reticule from the web.

25. Apparatus for manufacturing from a continuous web, subdivided foraminous reticules of various polygonal planiforms, including: rotative means at the input end of the apparatus for supporting a roll of the web material; tensile means for advancing the web therefrom forwardly of the apparatus adhesive-bearing roller means for applying to opposite faces of the continuously advancing web, longitudinally extending lines of adhesive with the lines on the one face laterally spaced in staggered relationship to the lines on the opposite face; knife means for incising the advancing web in transversely extending, longitudinally equidistant lines of slits with the slits in adjacent lines so mutually staggered laterally that the slits in one of said adjacent lines of slits are bisected by the lines of adhesive on one face of said web and the slits in the other of said adjacent lines are bisected by the lines of adhesive on the other face of said web; star-wheel means operatively associated with opposite faces of the advancing slitted web and including portions successively cooperable to displace successive portions of the advancing web alternately in opposite directions, so as to fold the web on said lines of slits; driven means disposed onwardly of said advancing and folding means for stacking the folds to bring the lines of adhesive on contiguous folds into engagement to unite said folds on said lines to form the web into a fan-folded, depthwise multi-cellular mass; friction-applying roller means disposed onwardly from said driven means at opposite lengthwise portions of the advancing mass for advancing the leading portion thereof faster than the trailing portion and lengthwise expanding the so-produced mass at right angles to the major axes of the cells to form a depthwise foraminous reticule; bath means for impregnating the walls of the cells with a web protective and strengthening material; and saw means disposed longitudinally and transversely adjacent opposite faces of the advancing reticule for longitudinally and transversely subdividing the reticule into submultiples of its original width and length so as to provide reticules of various planiforms.

26. Apparatus for manufacturing from a continuous web of flexible material and a pair of facing-sheets, a laminated panel including a foraminous reticulate core bonded facewise to said sheets, including: rotative means at the input end of the apparatus for supporting a roll of the web material; tensile means for advancing the web therefrom and forwardly of the apparatus; adhesive-bearing roller means for applying to opposite faces thereof longitudinally extending lines of a thermo-setting adhesive with the lines on the one face laterally offset in staggered relationship to the lines on the opposite face; knife-means for incising the advancing web in transversely extending, longitudinally equidistant lines of slits with the slits in adjacent lines so mutually staggered laterally that the slits in one of said adjacent lines of slits are bisected by the lines of adhesive on one face of said web and the slits in the other of said adjacent lines are bisected by the lines of adhesive on the other face of said web; cooperating star-wheel means for fan-folding the web alternately in opposite directions on said lines of slits; driven means disposed onwardly of said advancing and folding means for stacking the folds contiguously to form the web into a fan-folded mass; means for heating the mass while same is advancing to activate the adhesive, unite said folds adhesive-line-to-adhesive-line, and form a depthwise multi-cellular lengthwise compact mass; mass-direction-changing roller means disposed onwardly of said heating means at opposite lengthwise portions of the advancing mass for advancing the one peripheral half of successive portions of the mass faster than the other peripheral half so as to slightly expand the compact mass and flexibilize its folds to pre-condition the mass for full and uniform expansion; bath-type impregnating means disposed around said expanding mass and adapted to apply a web-protective and strengthening material thereto; friction-applying tensile rollers rotatively disposed at the onward portion of the advancing mass and friction applying hold-back rollers rotatively disposed at the trailing portion of said advancing mass and rotative at a lower rate than the tensile rollers, thereby to effect advance of the onward portion of the slightly expanded, multi-cellular mass faster than the trailing portion and through said impregnating means to simultaneously expand and impregnate said mass, whereby to form a depthwise foraminous reticule; heating means disposed around said advancing reticule for heating the impregnated reticule sufficiently to dry said impregnating material; abrasive roller means disposed adjacent opposite lengthwise faces of said reticule for abrading the opposite faces of said reticule sufficiently to reduce each of same to uniplanarity; routing-means disposed adjacent one lengthwise face of said reticule for re-moving transversely and longitudinally extending portions of the faces of the reticule sufficiently to accommodate edge-joggles on said facing sheets; applicator means disposed adjacent each of the opposite faces of said advancing reticule for depositing a solvent-containing thermo-setting adhesive on the outer edges of the ends of each cell in the reticule; means for heating the so-treated reticule sufficiently to evaporate solvent from said thermo-setting adhesive; saw means disposed longitudinally and transversely adjacent opposite faces of the advancing reticule for longitudinally and transversely subdividing the reticule into submultiples of its original width and length; sheet transferring-means disposed to cooperate with opposite lengthwise faces of said reticule for applying facing sheets facewise to opposite faces of said reticule; and means disposed adjacent the outer faces of said sheets for heat-and-pressure bonding said sheets to said reticule, and curing said impregnating material.

27. Apparatus for making a multi-cellular, multi-layered pack from a web, comprising: means for advancing the web into the zone of operations; means for applying to opposite faces of the advancing web longitudinally extending lines of adhesive with the lines on the one face laterally spaced in staggered relationship to the lines on the opposite face; means for incising the advancing web with transversely extending longitudinally equidistantly spaced lines of slits with the slits in adjacent lines so staggered that each of said slits in the one of said adjacent lines intersects the adhesive lines on the one face of said web and is spaced longitudinally from the longitudinally adjacent end of the next adjacent slit a distance slightly greater than the width of an adhesive line on the opposite face of said web geometrically included between said slit-ends, said slits being also so staggered that each of said slits in the other of said adjacent lines intersects the adhesive lines on said opposite face and is spaced longitudinally from the longitudinally adjacent end of the next adjacent slit a distance only slightly greater than the width of an adhesive line on said one face that are geometrically included between said slit-ends; and means for folding said web alternately in opposite directions on said lines of slits to unite said folds on said lines of adhesive and form said web into a depthwise and breadthwise multi-cellular, lengthwise compact pack.

28. Apparatus for making a multi-cellular, multi-layered pack from a web, comprising: means for advancing the web into the zone of operations; means for applying to opposite faces of the advancing web longitudinally extending lines of adhesive with the lines on the one face laterally spaced in staggered relationship to the lines on the opposite face; means for incising the advancing web with transversely extending longitudinally equidistantly spaced lines of slits with the slits in adjacent lines so staggered that the slits in the one of each pair of adjacent lines intersect the adhesive lines on the one face of the web and are bisected by the same with their longitudinally adjacent ends spaced apart a distance only slightly greater than the width of an adhesive line, and said slits being so staggered that the slits in the other of each pair of adjacent lines intersect the adhesive lines on the opposite face of the web and are bisected thereby with their longitudinally adjacent ends spaced apart a distance only slightly greater than the width of an adhesive line; means for folding said web alternately in opposite directions on said lines of slits to form a fan-folded mass; and means for stacking said folds and applying compression perpendicularly thereto to more firmly unite same on said lines of adhesive and form said web into a depthwise and breadthwise multi-cellular, lengthwise compact pack.

29. In an apparatus of the type described for making a multi-cellular, multi-layer pack from a web of flexible, fan-folded material bearing lines of adhesive extending longitudinally on opposite faces in mutually staggered relationship as regards the faces: means for feeding said material into a fold-compacting zone; a pair of endless belts disposed one on each side of the advancing material in the initial portion of said zone in parallelism with its path of advance and in tangential contact with the fold-edges and revolvable at the same speed, so as to apply a constant force uniformly to the fold-edges and advance said material onwardly of said zone; and a pair of endless belts disposed one on each side of the advancing material in an onward portion of said zone in parallelism with the path of advance of said material and in tangential contact with the fold-edges thereof and revolvable at a speed sufficiently slower than the speed of the first-said belts to apply to said edges a drag-force sufficient to compressionally unite said folds on said lines of adhesive without decelerating the advance thereof, whereby to form said fan-folded material into an expandible multi-cellular, multi-layer pack.

30. As a new article of manufacture, a pack comprising: a single integral, fan-folded web of material presenting a plurality of contiguous lines of fold at opposed lengthwise faces of said pack; parallel adhesive lines extending across each face of each fold substantially at right angles to said lines of fold and uniting each face to the adjacent face of the contiguous fold along a series of lines staggered with respect to the adhesive lines uniting the opposite face of said fold to the face of the next adjacent fold; the lines of fold at opposite faces of said fan-folded web being broken by lines of spaced incisions, the incisions formed in the lines of fold on the one face of said fan-folded web being laterally staggered with respect to the incisions formed in the lines of fold on the opposite face of said fan-folded web.

31. As a new article of manufacture, a pack comprising: a single, integral, zig-zag folded web of material presenting a plurality of contiguous lines of fold at opposed faces of said pack; parallel adhesive lines extending across each face of each fold substantially at right angles to said lines of fold and uniting each face to the adjacent face of the contiguous fold along a series of lines staggered with respect to the adhesive lines uniting the opposite face of said fold to the face of the next adjacent fold; each line-of-fold at the one face of said zig-zag folded web being broken by a line of spaced incisions intersecting the adhesive lines which unite one face of each zag fold to the one face of the adjacent zig fold, each line of fold at the opposite face of said zig-zag folded web being broken by a line of spaced incisions intersecting the adhesive lines which unite the opposite face of each zag fold to the one face of the other adjacent zig fold.

32. Apparatus for manufacturing from an elongate web a depthwise foraminous reticule, comprising: means at the input end of the apparatus for supporting a supply of the web material; means for advancing the web therefrom forwardly of the apparatus; means disposed adjacent opposite faces of the advancing web for applying to said opposite faces longitudinally extending lines of adhesive material with the lines on the one face laterally offset in staggered relationship to the lines on the opposite face; cooperating means for incising the advancing web in transversely extending longitudinally equidistant lines; means for folding the advancing web alternately in opposite directions on said longitudinally equidistant transversely extending lines of incisions; means for stacking the folds contiguously to unite the same on said lines of adhesive material to form a depthwise, breadthwise, multi-cellular, longitudinally relatively compact mass of the depth equal to the distance between said lines of incisions; and means for severing the thus produced mass from the web.

33. Method of making from an elongate web a depthwise foraminous reticule comprising the steps of: advancing the elongate web into the zone of operations; applying to opposite faces of the advancing web longitudinally extending lines of layer unitable material with the lines on one face of the web laterally spaced in staggered relationship to the lines of the unitable material on the other face of the web; incising the advancing web on transversely extending longitudinally equidistant segmental lines; folding the advancing web alternately in opposite directions along said incision lines; stacking the folds contiguously to unite the same on said lines of unitable material to form a depthwise and breadthwise multi-cellular, lengthwise compact fan-folded mass of thickness equal to the distance between said incision lines; and thereafter severing the thus processed mass from the web to form a separate article.

NATHANIEL A. LOMBARD.
THOMAS L. TAGGART.

REFERENCES CITED

The following references are of record in the file of this patent:

UNITED STATES PATENTS

| Number | Name | Date |
|---|---|---|
| 765,412 | Budwig | July 19, 1904 |
| 1,389,294 | Dean | Aug. 30, 1921 |
| 1,721,085 | Novick | July 16, 1929 |
| 1,924,472 | Thomson | Aug. 29, 1933 |
| 2,142,894 | Grigg | Jan. 3, 1939 |
| 2,333,343 | Sendzimer | Nov. 2, 1943 |
| 2,428,979 | May | Oct. 14, 1947 |